United States Patent
Shaposhnik

(10) Patent No.: US 10,178,073 B2
(45) Date of Patent: Jan. 8, 2019

(54) METHOD TO SPLIT DATA OPERATIONAL FUNCTION AMONG SYSTEM LAYERS

(71) Applicant: PRISTINE MACHINE, LLC, West Bloomfield, MI (US)

(72) Inventor: Yona Shaposhnik, West Bloomfield, MI (US)

(73) Assignee: Toucanh LLC, Wilmington, DE (US)

( * ) Notice: Subject to any disclaimer, the term of this patent is extended or adjusted under 35 U.S.C. 154(b) by 0 days.

(21) Appl. No.: 15/552,340

(22) PCT Filed: Feb. 22, 2016

(86) PCT No.: PCT/US2016/018980
§ 371 (c)(1),
(2) Date: Aug. 21, 2017

(87) PCT Pub. No.: WO2016/134380
PCT Pub. Date: Aug. 25, 2016

(65) Prior Publication Data
US 2018/0041477 A1    Feb. 8, 2018

Related U.S. Application Data

(60) Provisional application No. 62/118,478, filed on Feb. 20, 2015.

(51) Int. Cl.
*H04L 29/06* (2006.01)
*G06F 21/53* (2013.01)
*G06F 9/455* (2018.01)

(52) U.S. Cl.
CPC ...... *H04L 63/0428* (2013.01); *G06F 9/45545* (2013.01); *G06F 21/53* (2013.01)

(58) Field of Classification Search
CPC ... H04L 63/0428; G06F 21/53; G06F 9/45545
See application file for complete search history.

(56) References Cited

U.S. PATENT DOCUMENTS

| | | | | |
|---|---|---|---|---|
| 6,289,451 | B1 * | 9/2001 | Dice | H04L 9/3236 713/168 |
| 7,305,092 | B2 * | 12/2007 | Mauro | H04L 29/06 380/247 |
| 7,500,264 | B1 | 3/2009 | Leavy et al. | |

(Continued)

OTHER PUBLICATIONS

International Search Report dated Jun. 2, 2016 for International Application No. PCT/US2016/018980 filed Feb. 22, 2016.

*Primary Examiner* — Darren B Schwartz
(74) *Attorney, Agent, or Firm* — Avery N. Goldstein; Blue Filament Law PLLC

(57) ABSTRACT

A method for accelerating data transfer and improving data storage in a computing environment is provided that includes splitting a function into two layers of an operating system to generate two separate sets of outcomes from the two layers. A set of outcomes from the two layers are combined so as to be imperceptible to a user save for faster operation. The splitting of the function is evaluated and optimized based on machine performance feedback. A computing system for communicating with a network is provided that performs this method. A bifurcated operating system affords additional advantages in performing function splitting.

23 Claims, 14 Drawing Sheets

(56) References Cited

U.S. PATENT DOCUMENTS

| | | |
|---|---|---|
| 8,843,926 B2 | 9/2014 | Shaposhnik |
| 9,607,151 B2* | 3/2017 | Mooring .............. G06F 9/45558 |
| 2003/0217149 A1 | 11/2003 | Crichton et al. |
| 2005/0149721 A1* | 7/2005 | Lu ....................... H04L 63/0227 713/154 |
| 2006/0133428 A1* | 6/2006 | Guthrie ............... H04L 43/0858 370/519 |
| 2006/0239216 A1* | 10/2006 | Chen ..................... H04L 45/124 370/310 |
| 2007/0043940 A1 | 2/2007 | Gustave et al. |
| 2007/0081512 A1* | 4/2007 | Takeda ................. H04L 63/164 370/349 |
| 2007/0223533 A1* | 9/2007 | Kirrmann ................. H04L 1/22 370/469 |
| 2007/0266134 A1* | 11/2007 | Shyy ..................... H04W 99/00 709/223 |
| 2009/0138715 A1* | 5/2009 | Xiao ..................... H04L 9/0838 713/171 |
| 2010/0228887 A1* | 9/2010 | Koike ..................... G06F 9/455 710/9 |
| 2010/0322071 A1* | 12/2010 | Avdanin .............. H04L 43/0894 370/230 |
| 2010/0325418 A1* | 12/2010 | Kanekar ............. H04L 63/0823 713/151 |
| 2012/0059921 A1* | 3/2012 | Serban ................ G06F 11/3664 709/223 |
| 2012/0100895 A1* | 4/2012 | Priyantha .......... H04W 52/0293 455/574 |
| 2012/0144489 A1* | 6/2012 | Jarrett ................... G06F 21/566 726/24 |
| 2012/0173870 A1* | 7/2012 | Reddy ................. H04L 63/0428 713/153 |
| 2013/0024940 A1* | 1/2013 | Hutchins ............. G06F 9/45558 726/24 |
| 2013/0332923 A1* | 12/2013 | Shaposhnik ............ G06F 21/57 718/1 |
| 2013/0332924 A1* | 12/2013 | Shaposhnik ............ G06F 21/57 718/1 |
| 2013/0336320 A1* | 12/2013 | Rangaraman ............ H04L 45/38 370/392 |
| 2013/0347131 A1* | 12/2013 | Mooring ............. G06F 9/45558 726/29 |
| 2015/0156023 A1* | 6/2015 | Hyun .................... H04L 9/3236 713/176 |
| 2017/0192801 A1* | 7/2017 | Barlev ................. G06F 9/4555 |
| 2017/0279678 A1* | 9/2017 | Kleynhans .......... H04L 41/0816 |
| 2017/0331789 A1* | 11/2017 | Kumar ................ H04L 63/0272 |

* cited by examiner

METHOD TO SPLIT DATA OPERATIONAL FUNCTION AMONG SYSTEM LAYERS

CROSS REFERENCE TO RELATED APPLICATIONS

This application claims priority benefit of U.S. Provisional Application Ser. No. 62/118,478 filed 20 Feb. 2015; the contents of which are hereby incorporated by reference.

FIELD OF THE INVENTION

The present invention relates generally to the field of computing, and more specifically to a new and useful methods for secure and efficient computing and data transfer and in particular to bifurcating a function into two layers such that the combined result is the same as conventional operation expect without the reduction in speed.

BACKGROUND OF THE INVENTION

The Open Systems Interconnection model (OSI model) is a conceptual model that characterizes and standardizes the communication functions of a telecommunication or computing system without regard to their underlying internal structure and technology. The OSI model provides for the interoperability of diverse communication systems with standard protocols. The model partitions a communication system into a set of seven abstraction layers. Each of the layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer. The seven layers of the OSI model are 7—Application, 6—Presentation, 5—Session, 4—Transport, 3—Network, 2—Data link, and 1—Physical, where layer 1 (Physical) is the lowest level.

The physical layer defines: the electrical and physical specifications of a data connection; the relationship between a device and a physical transmission medium (e.g., a copper or fiber optical cable, radio frequency) and includes the layout of pins, voltages, line impedance, cable specifications, signal timing and similar characteristics for connected devices and frequency (5 GHz or 2.4 GHz etc) for wireless devices; defines transmission mode (i.e., simplex, half duplex, full duplex); and defines the network topology as bus, mesh, or ring being some of the most common. The physical layer of Parallel SCSI operates in this layer, as do the physical layers of Ethernet and other local-area networks, such as Token Ring, FDDI, ITU-T G.hn, and IEE 802.11 (Wi-Fi), as well as personal area networks such as Bluetooth and IEEE 802.15.4.

The data link layer provides node-to-node data transfer—a link between two directly connected nodes, and detects and possibly corrects errors that may occur in the physical layer. The data link layer defines the protocol to establish and terminate a connection between two physically connected devices, and also defines the protocol for flow control between devices. IEEE 802 divides the data link layer into two sublayers: Media Access Control (MAC) layer—responsible for controlling how devices in a network gain access to data and permission to transmit it, and Logical Link Control (LLC) layer—responsible for identifying Network layer protocols and then encapsulating them and controls error checking and packet synchronization.

The network layer provides the functional and procedural means of transferring variable length data sequences (called datagrams) from one node to another connected to the same network, and translates a logical network address into a physical machine address. A network is a medium to which many nodes can be connected, on which every node has an address and which permits nodes connected to the network to transfer messages to other nodes connected to the network by merely providing the content of a message and the address of the destination node and letting the network find the way to deliver ("route") the message to the destination node. In addition to message routing, the network may implement message delivery by splitting the message into several fragments, delivering each fragment by a separate route and reassembling the fragments, report delivery errors, etc.

The transport layer provides the functional and procedural means of transferring variable-length data sequences from a source to a destination host via one or more networks, while maintaining the quality of service functions. An example of a transport-layer protocol in the standard Internet stack is Transmission Control Protocol (TCP), usually built on top of the Internet Protocol (IP). The transport layer controls the reliability of a given link through flow control, segmentation/desegmentation, and error control. Some protocols are state- and connection-oriented. This means that the transport layer can keep track of the segments and retransmit those that fail. The transport layer also provides the acknowledgement of the successful data transmission and sends the next data if no errors occurred. The transport layer creates packets out of the message received from the application layer. Packetizing is a process of dividing the long message into smaller messages.

The session layer controls the dialogues (connections) between computers, and establishes, manages, and terminates the connections between the local and remote application. The session layer provides for full-duplex, half-duplex, or simplex operation, and establishes check pointing, adjournment, termination, and restart procedures. The session layer is commonly implemented explicitly in application environments that use remote procedure calls.

The presentation layer establishes context between application-layer entities, in which the application-layer entities may use different syntax and semantics if the presentation service provides a big mapping between them. If a mapping is available, presentation service data units are encapsulated into session protocol data units, and passed down the protocol stack. The presentation layer provides independence from data representation (e.g., encryption) by translating between application and network formats. The presentation layer transforms data into the form that the application accepts. This layer formats and encrypts data to be sent across a network, and is sometimes called the syntax layer.

The application layer is the OSI layer closest to the end user, which means both the OSI application layer and the user interact directly with the software application. The application layer interacts with software applications that implement a communicating component. Such application programs fall outside the scope of the OSI model. Application-layer functions typically include identifying communication partners, determining resource availability, and synchronizing communication. When identifying communication partners, the application layer determines the identity and availability of communication partners for an application with data to transmit. When determining resource availability, the application layer must decide whether sufficient network or the requested communication exists. In synchronizing communication, all communication between applications requires cooperation that is managed by the application layer. The application layer supports application and end-user processes. Communication partners are identified, quality of service is identified, user authentication and privacy are considered, and any constraints on data syntax are identified. Everything at the application layer is application-specific.

Network input and output (I/O) is frequently a bottleneck in distributed applications. The I/O bottleneck is primarily due to the multiple layers of the Open Systems Interconnection (OSI) model or Ethernet communications where each network packet is enclosed in multiple envelopes for Level 2, Level 3, and Level 4 communications. The multiple layers of the communication models and standards also cause additional central processing unit (CPU) overhead to perform packet repackaging and communication encryption. While the use of the cloud provides significant agility and flexibility, as well as being highly manageable through the isolation provided by the cloud, where communication between cloud nodes often does not even have to go through a network outside of the cloud, overhead is still present.

Data storage is typically optimized in different ways as consistency, availability, and partition tolerance are not available in a single type of data storage as shown by the CAP theorem first advanced by Eric Brewster (University of California at Berkeley). In theoretical computer science, the CAP theorem, also known as Brewer's theorem, states that it is impossible for a distributed computer system to simultaneously provide all three of the following guarantees: consistency (all nodes see the same data at the same time), availability (a guarantee that every request receives a response about whether it succeeded or failed), and partition tolerance (the system continues to operate despite arbitrary message loss or failure of part of the system). An additional property that has proven to be a constraint for the optimization of data storage is scalability. Thus a Hadoop database is quite different from a traditional transactional database. Apache Hadoop is an open-source software framework for distributed storage and distributed processing of Big Data on clusters of commodity hardware. Its Hadoop Distributed File System (HDFS) splits files into large blocks (default 64 MB or 128 MB) and distributes the blocks amongst the nodes in the cluster. For processing the data, the Hadoop Map/Reduce ships code (specifically Jar files) to the nodes that have the required data and the nodes then process the data in parallel. The Hadoop approach takes advantage of data locality, in contrast to conventional highly parallel computing (HPC) architecture which usually relies on a parallel file system (compute and data separated, but are connected with high-speed networking). Endpoints in computer networks are the most vulnerable and unprotected portion in a network, and over 70% of data breaches occur at the endpoints. Targeted cyber-attacks have the ability to side step traditional detection-based security defenses, rendering antivirus software ineffective, with detection rates of only 25% to 50% which are not good enough. The low detection rates of viruses and cyber-attacks cause enterprises to be caught in a never-ending, costly cycle of chasing false positives, getting compromised, and re-imaging PCs.

Currently, there are several computer security products available that protect user endpoints from advanced malware, zero-day threats and drive-by attack, while allowing employees to safely use the internet, email and removable media, without putting an enterprise at risk.

Bufferzone® offers isolation within an operating system (OS), with access configured by a user. However, user configuration may allow for a security breach/data leak if a user either makes a mistake or deliberately weakens security controls. Bufferzone® works in conjunction with the Windows OS kernel, and as such is subject to changes within OS, and can be uninstalled. Additionally, malicious patches to an OS could potentially interfere with software integrity. The Bufferzone® approach includes identification, securing through keeping different application functions within different containers, all within one OS. Each security point must be classified as either in a secure container or an insecure container. From an engineering point of view, the number of permutations to be managed could well be significant, and certain situations may not have a pre-defined classification. Disposition may be difficult, because classification may depend on specific user environment. Additionally, the Bufferzone® technology runs as a user application, and as such is visible to the user, fully integrated, and not transparent.

Bromium® secures endpoint computers through micro-virtualization, using a micro-virtual machine (VM) for each process, where template end-caching to accelerate running processes in a micro-VM guarantees isolation of processes, and even if the specific process is affected, the overall system is not affected. For example, every time a user opens an email or browses the web or shares files, the Bromium® software isolates the task in a micro-virtual machine (micro-VM), and once the task is completed, the micro-VM is discarded, malware and all. However, the Bromium® approach needs to be applied to EVERY POSSIBLE permutation, making it extremely complex to implement. Handling each new platform may require specialized engineering and encoding. Additionally, the Bromium® method causes a significant performance hit, requiring additional resources (1 GB to cache templates=micro VMs). Specific models are required to accelerate the micro-virtualization process. Despite Bromium's unique ability to secure policy, Bromium's biggest weakness is that it cannot handle security policy on a macro level, presenting additional challenges to flexibility and usability.

An additional network security approach that relies on virtualization is Moka5 of Moka5, Inc. Moka5 is within the OS, and is actually enabled by the Windows kernel driver. Moka5 works through splitting layers within the OS, a layer for user applications, for user settings, for corporate applications and settings, and so on. Unlike Bufferzone®, Moka5's layering is horizontal, not vertical. The Moka5 software's main concept is the managing of a user interface across multiple computer nodes. The personalized desktop (layer) of a specific user can be decoupled, and run in multiple environments. Layering the OS allows consistent management of base layers, and enables many features. However, since the installation is within the OS, isolation is not complete, and Moka5 cannot provide full assurance on the macro level. Additionally, Moka5 requires software deployment of agents on multiple computing nodes. Different platform/environment/configuration requires specialized software extensions (modules) to enable functionality.

Furthermore, the OSI network model has proven to be insecure since nodes on the network are open with only a firewall to protect them. Currently most networks are protected through firewalls using techniques called white listing and black listing (on various levels such as physical, Internet protocol (IP) addresses, host names, and protocols) as well as intrusion detection by detecting unwanted network activity and stopping it in real time. However, these techniques do not provide the level of security that is called a level of assurance, and an intruder can impersonate other devices by duplicating the addresses/names, replaying network packets, or tricking a user into downloading malware that would initiate connection from within. It is possible to secure the traffic using methods like Secure Sockets Layer (SSL) tunnels but those add significant overhead in comparison to regular network communications in term of throughput, CPU and memory utilization. As signature of attacks are frequently mutating software, methods in updating time measures are required. In terms of software configurations, the software configurations are themselves often subject to disabling and modification attacks.

Bifurcation is the combining of two operating systems (OS) called a host and a guest, and a bifurcated operating system is the subject of U.S. Pat. No. 8,843,926 that issued on Sep. 23, 2014 entitled "Guest Operating System Using Virtualized Network Communication", commonly owned by the assignee of this application and herein incorporated by reference in its entirety. The host OS is hardware based and generates a virtual machine program that runs the guest OS. The guest OS is the user interface level, and handles every user instruction and productivity programs such as word processors, spreadsheets, presentation software, and Web browser. While the user is unaware of the host OS existence, every process goes through the host OS. The host OS is a static structure that is preinstalled in the operating hardware as read only. All updates that a user does are saved as added layers on top of the original settings of the host OS. On system restart, the hardware loads the host OS as originally pre-installed, and the update layers are then applied over the original host OS. An algorithm identifies redundancies in the update layers and consolidates them. If malware is loaded on to a computer, the system automatically restores itself deleting the one or more update layers containing the malware. The bifurcated OS provides a secure computer system that does not require user-initiated system software maintenance.

A bifurcated OS provides security advantages to computers and networks since user content and the controlling operating system are physically and logically separated and therefore a controlling device cannot be compromised by outside security attacks via a content provider network. The increased level of operating security, from man in the middle, spyware, malware, phishing, and other illicit attacks on user devices, through the use of a bifurcation lend itself not only to adding just richness from a content aggregation point of view, but provides new devices, with novel functions applicable to e-commerce. In addition, potential data leaks are prevented through an anti-bridging policy. A current weakness of e-commerce is the weak level of authentication of both client and vendor which stops many consumers from wider acceptance of the use of electronic transactions because of fear of stolen identity. Hardware bifurcation serves a triple function of: 1) providing additional factors in authentication (distributing authentication through multiple authentication channels, using the static location of hardware component as an actor in authentication, monitoring movement of purchaser, ability to complete transaction in store); 2) bifurcating/distributing a transaction, for example a user could initiate as an e-transaction and complete as in-store transaction, which could solve the problem of caching credit card information into a phone; and 3) credentials and personal information are protected from malware/phishing from Internet sources since credentials and personal information are not stored in the hardware layer that communicates/interfaces with the Internet.

However, current implementations of a network controller in the bifurcated operating system have the following disadvantages and drawbacks including: low speed, high utilization of the central processor unit (CPU) usage—less then 10% of allowed bandwidth; support for only outbound connections, support for only IPv4 and TCP; and security limitations (man-the-middle attacks are possible).

Thus, there is a need for effective, secure, fast, and efficient methods and systems to accelerate network communication while protecting against unauthenticated network traffic and optimizing data storage, while providing network security. There further exists a need for bifurcated function operation between two layers so as to allocate computation between the two layers to operate on data without the speed bottleneck that is currently created by such functions operating as a unified function within a single layer.

SUMMARY OF THE INVENTION

A method for accelerating data transfer and improving data storage in a computing environment is provided that includes splitting a function into two layers of an operating system to generate two separate sets of outcomes from the two layers. A set of outcomes from the two layers are combined so as to be imperceptible to a user save for faster operation. The splitting of the function is evaluated and optimized based on machine performance feedback.

A computing system for communicating with a network is provided that performs this method. A bifurcated operating system affords additional advantages in performing function splitting.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
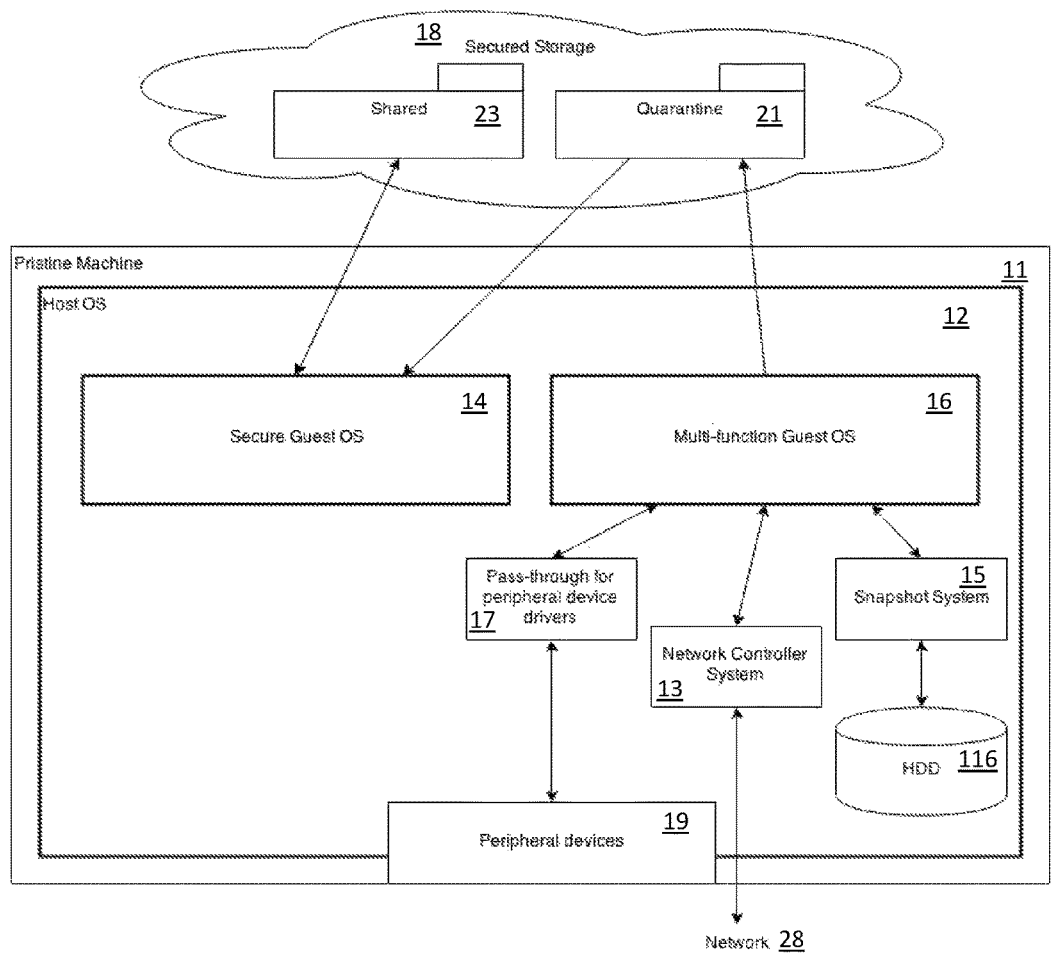
FIG. 1 is a block diagram of a computing system implemented as a pristine machine with a bifurcated OS in accordance with embodiments of the invention.

The present invention has utility in performing operation on digital data, synonymously referred to herein as packets or data packets, through bifurcation of functions into two separate layers. Algorithms are split with only part being run in each layer space and the outcomes combined. In this way greater speed results and the user sees no differences relative to conventional unified function operation save for a marked increase in speed. The split can be determined by human selection of how to parse the function between the two environments or be done by machine, afterwards once the split has been made it can be optimized based on machine performance feedback (speed is normalized based on initial split, then part of algorithm is moved between layers and if speed goes up, keep it, else revert and try something else). If there are two conflicting vectors in the same function, those are automatically split to get maximal throughput. While the present invention is detailed with respect to function bifurcation between two layers, it is appreciated that a given function can be allocated among three or even four layers, and the sets of outcomes recombined in a manner similar to the two layer embodiments detailed herein.

The invention disclosed herein describes a system and method for accelerating data transfer and improving data storage in computing environments, as well as insuring network security. While it is appreciated that a bifurcated operating system (OS) in computing environments offers several advantages, function bifurcation between layers is readily achieved using a convention operating system. The present invention is also applicable to use in a cloud environment. In a specific embodiment, the host OS may perform actual data sharing in a manner that the host OS wants, while to the guest OS the data sharing would appear like a traditional communication. So for example, nodes communicating within the same physical server, network communication may be converted to a raw data stream for which the host OS presents source data to a destination as if the source data has been received. In fact, data does not need to travel or is even copied to memory, rather embodiments of the present invention provide a single priority queue for which the host OS provides different ranges to the source and destination, and just a separator between source and destination is moving. Embodiments of this approach may also be applicable for virtual network I/O to storage node (object and block storage). Embodiments of the new approach enable the creation of a system that does not have a network I/O and I/O bottleneck where these bottlenecks are usually present. If a destination cannot process I/O quickly enough, for example due to speed of writes, I/O may be throttled via cache but in-memory communication would be able to remain close to real time. Furthermore, this approach may be extended even to nodes on multiple physical servers, where the stream may reside in shared memory interconnect. In addition, even if part of the cloud is located in a different physical location, the shared data stream may be simulated via bulk communications using jumbo frames to minimize and eliminate a lot of network packet packaging, routing and delivery overhead.

Bifurcating a function to allocate parts of the function algorithm to two layers speeds up most operations compared to the same components operating a unified function. Specifically, control algorithms are run separately from data to avoid the bottle neck of data auditing before the data is sent. In contrast, it is conventional now to embed controls and the checking of data must be completed before data can be moved causing the bottleneck. While the present invention is not parallel processing, there is analogy. Specifically, an inventive bifurcation is performed in a simplified embodiment simply by loading the complete function into two layers and selectively disabling algorithm code from a top layer with complementary enabled algorithm code in the underlying level. Algorithm code can be shifted between layers to optimize speed. The allocated, split function processing precludes the need for parallel processing coding, multiple CPUs and other limitations associated with parallel processing.

The present invention is applicable to network data/data services, where network controls that might be used illustratively include packet integrity, packet security, or packet authentication. Additionally, the present invention is also suitable for data service controls that illustratively include response time, data integrity with concurrent use, and real time data access.

Furthermore, embodiments of the inventive method and system also provides protection against unauthenticated network traffic, while guaranteeing the integrity of network traffic with the use of the bifurcated operating system (OS) without noticeable performance degradation. Embodiments of the invention provide assurance of the authenticity of a network communication to prevent disguise and impersonation of others by attacking entities and hackers. Embodiments of the inventive method embed network packets using a Secure Sockets Layer (SSL) key on a low network stack level (L2), where the entire data portion of the L2 frame may be encrypted, of for some common protocols illustratively including TCP/IP routing information on higher stacks may be left unencrypted to allow the inventive method to work with legacy network switches and firewalls. Encryption and up encryption may be implemented as a network filer using a kernel space of the host operation system within the bifurcated OS. The elimination of a performance penalty with respect to the bifurcated OS is accomplished with user mode data structures and context switches that do not allow the user and/or malware to disable an encryption policy. Using embodiments of the invention, even if questionable packets enter the network, that would not prove to be dangerous as the packet will not pass encryption/decryption.

An attribute of the present invention is the assurance of authenticity to prevent disguise (impersonation of others). Through the exchange SSL keys before threshold and physical packet change, security is provided along with enhanced data transmission speed. In certain inventive embodiments, protocol encryption SSL is injected into network stack IP Level 3, PCP Level 4, or a combination thereof, where the level numbers refer to the seven layer stack of conventional stack architecture. A simplified procedure of the present invention involves the steps of identifying MAC/IP address/host name, signing (encrypting) SSL sent between communicative devices, with each given a specific identity. SSL and identity information are then exchanged. The present invention affords commercial value through the assurance of soft assets and networks. The usage of a procedure or system according the present invention can be done in exchange for financial remuneration on a sale or lease basis.

In a specific inventive embodiment, two separate systems with a bifurcated OS may implement the method, where network traffic is encrypted but network throughput remains equal to that of unencrypted traffic as packet size is the same, with no additional memory allocation or required interrupts due to context switching. In a second inventive system embodiment, a bifurcated physical system may be used as a communication node, where the physical host may shield insecure devices within an internal network from a data traffic breach. In a third inventive system embodiment, a shared physical component is used to maintain identities of downstream guest devices, where each guest node communicates with outside nodes individually but security policy is centrally maintained and cannot be circumvented.

As described above, there is a need for improved network security tools to combat viruses and cyber-attacks that do not significantly reduce packet transfer rates. "Significant" in this context is defined as reducing speed by no more than 20% compared to no such tool being present.

While the present invention can operate with a convention BIOS OS, it is appreciated that certain additional advantages are obtained by usage within a bifurcated OS. Pristine Machine, the assignee of this application, provides macro-virtualization, in contrast to prior solutions, that deploys a policy assurance layer inside the host OS, an inaccessible host OS which cannot be tampered with. Through mutual encapsulation, the policy functions in the host layer are oblivious of the guest layer, no matter what OS is deployed/patched, which enables flexibility and transparency, to the extent that the resulting system is identical to whatever it was before, with the underlying layer completely invisible. Through the level of obstruction made possible by mutual encapsulation, peripheral drivers may be pushed to the guest layer to achieve physical device-like performance, leveraging hardware-based acceleration like dynamic memory allocation (DMA) and memory management unit MMU. Pristine Machine's method of construction ensures policy (such as no leaks) on a macro level.

Furthermore, embodiments of the micro-virtualization method provided herein may be easily transferred between different platforms (e.g., various CPU architectures, cloud and network databases). Embodiments of the micro-virtualization method provide a mutually encapsulated combination of host and guest, and enables the host and guest to do things together that neither one could do alone, as in the CAP theorem. Embodiments of the micro-virtualization method enable the preservation and protection of a pristine, validated computing state, without infringing on usability or flexibility.

As described above in theoretical computer science, the CAP theorem states that it is impossible for a distributed computer system to simultaneously provide all three of the following guarantees: consistency (all nodes see the same data at the same time), availability (a guarantee that every request receives a response about whether it succeeded or failed), and partition tolerance (the system continues to operate despite arbitrary message loss or failure of part of the system). Embodiments of the inventive system and method for accelerating data transfer and improving data storage in computing environments attempt to overcome the optimization limitations of CAP theorem by balancing the scalability of object storage that can scale in size but does not have a particularly good response time, with the immediate consistency that is found in relational database management systems (RDBMS). Embodiments of the invention combine data access technologies with differing strengths and weaknesses to overcome CAP theorem limitations that dictate no single approach can overcome. In an embodiment RDBMS is used as a front layer to act as a listener to handle responses to queries with object storage, where a translation layer (using virtualization) moves data cubes (parts) from RDBMS storage and object storage objects, where an object is frequently cached into RDBMS for fast retrieval.

Disc caching for data retrieval is generally not very effective, because when OS match data needs to move the data into memory first and since entire disc needs to be search even when there is a mismatch. Object storage is much slower than RDBMS, but all object data are addressed via HTTP REST API. Objects may be cached used when there is a consistently named scheme even without copying entire objects into computer memory. Moreover this caching can now be off-loaded into a peripheral. Therefore, caching and memory addressing is improved though REST addresses could be bound straight to a peripheral similar to DMA or other hardware acceleration methods such as memory management unit (MMU). Therefore, there is a need for OS block management and scheduling (a very expensive operation) and with hard drives having their own on-board memory to be connected straight into a memory bus, thereby avoiding a need for PCI. Thus, the combination of two desperate data technologies RDBMS and object storage may produce better access speed than either one of them alone. In terms of consistency RDBMS provides immediate localization when geographic affinity is configured, so for example a user of a reservation system has a high probability for obtaining a correct reservation when a transaction occurs, with an eventual consistency check that ensures total transaction integrity and a correct and consistent reservation.

In embodiments of the invention, data is partitioned into smaller objects that are spread on multiple disks; kinetic disks can save energy as the disks would spin only if data they store is used. That would not be possible with monolithic database that requires data to be on a single entire disk. Having database data in larger object cubes would increase compression of data in comparison to object storage as larger objects have smaller input/output (I/O) and network I/O overhead (for network attached storage (NAS)). Similarly, for network optimization in a cloud environment is not a concept that stands by itself, but is achieved by a bifurcation of network function through the synergizing of two approaches in data transfer between computer nodes.

In order to address the optimization of data storage, embodiments of the invention employ a two tier data storage where the front tier is optimized for a functional property required (consistency, availability and partition tolerance) and the back tier consists of object storage of binary large objects (BLOBs) that may be assembled for various front end tier permutations such as a relational database (i.e., Postgre, SQL, etc.). A BLOB is a collection of binary data stored as a single entity in a database management system. BLOBs are typically images, audio or other multimedia objects, though sometimes binary executable code is stored as a blob. Database support for BLOBs is not universal. Only subsets of data would be upload to the front tier as needed, which is possible if BLOBs contain data segregated by shared common logical property that is also known as an index that may be a time stamp or a source for unstructured data. The BLOB name would contain this index in its name so that only BLOBs related to the request are pulled to the front tier. Alternatively, a BLOB may be sliced per request criteria and only part of the BLOB would be loaded to a front tier for assembly. The back tier would be responsible for scalability, backup, retention, and high availability. Additional optimization in intra-tier communication may be achieved using the methods described to minimize network and storage I/O bottlenecks.

As disclosed in U.S. Pat. No. 8,843,926 entitled "Guest Operating System Using Virtualized Network Communication" of Applicant and is included by reference in its entirety, a bifurcated OS is used to create personal computing devices that preserve full usability and flexibility while ensuring that critical secure data cannot be leaked. Systems using a bifurcated OS have self-recovery features to preserve their stability and pristine state. A bifurcated OS has a guest operating system that is refreshed from a master image of the guest operating system repeatedly in connection with use of one or more electronic devices on which the guest operating system is hosted. A guest operating system is executed on a virtual machine, and, from time to time, while the virtual machine is running, the guest operating system is reloaded from a master image of the guest operating system.

A pristine state is used to defend against malware threats in the form of a prevention solution framework, where malware threats include:
1) virus and Trojan horses (files would be scanned prior to write onto secure storage)
2) worms (host is hardened to use essential and resilient network service that cannot be tampered with)
3) rootkits (the lowest level is not available to become repository for rootkits, higher level of rootkits are easily erasable when OS changes identified to contain them)
4) backdoors (strict isolation does not allow creating backdoors even via social engineering)
5) spyware and adware (critical data is isolated from all spyware and adware, non-critical data can be protected via installation of conventional virus protection software).

In a bifurcated OS a host controls the guest, but neither the guest nor anybody else can control or modify the host. Embodiments of the bifurcated OS are constructed to produce minimum overhead and maximum functionality according to each environment in which the OS is used.

In specific embodiments two approaches to hardware virtualization are employed. In a first approach hardware emulation occurs where the OS runs on a virtual computer on top of a host OS. A guest OS has an equivalent virtual driver for peripherals and the host OS has to deal with hardware and deploy corresponding hardware drivers on the host layer. An example of this is VMware™. The challenge of this approach is that the guest OS needs to be modified when deployed in a virtual environment, as the guest OS drivers would need to be replace with virtual ones. The Host OS limits hardware choices through compatibility limitations. Furthermore, tuning of I/O performance is very difficult as it has to be done on multiple layers, and the host OS is not aware of guest OS application requirements, which occurs for example with virtualization deployments on mobile devices.

A disadvantage of virtual drivers is a lack of hardware acceleration. A primary point of hardware acceleration is the offloading of processes from the main computer (dynamic memory allocation (DMA) is an example where a peripheral device writes to memory without the involvement of the main central processing unit (CPU) and the primary or main memory. A virtualized computer implemented in the computer CPU and primary memory is subject to failure when stress conditions are experienced. For example, with high rate of network errors (i.e., when promiscuous mode is enabled, a VIMware™ network switch is likely to fail, while a hardware based CISCO switch would work just fine).

In a second approach hardware emulation occurs where processes in OS looks like another (Linux VINE is an example). Disadvantages are lack of memory process space separation (security and stability) as well as performance loss that could be as high as five hundred times loss or two times in the base case scenario because of double memory tables and lack of optimization built-in into the hardware.

There are other optimized virtualization (hypervisor) approaches that gain some performance, such as para-virtualization and hardware acceleration. Para-virtualization allows for the running of some host functions on a lower level flattening virtualization stack. Hardware acceleration caches common instruction sets used in the virtualized system. Both of para-virtualization and hardware acceleration are complex and platform specific, and are not easy to port.

An advantage of the novel virtualization approach employed in embodiments of the invention is portability. A single host OS may be deployed on a variety of devices and under many guest OS variants. The novel virtualization approach does not need to manage physical device drivers. The novel virtualization approach just manages path-through and corresponding initialization routines. The guest OS remains intact. The host OS may be installed under guest OS after the fact with any configuration and application set, which allows for portability with cell phones, tablets, PC, cloud, etc. Variants of hardware architecture may be required (Intel® 32 bit, Intel® 64 bit, ARM) but other components works as is. For example, if someone has a Samsung® phone with peripherals manufactured by Samsung® and the drivers provided are binary (no virtualized drivers exist or could economically exist). The OS is also customized and encrypted by Samsung®. But with embodiments of the novel approach this is not a problem as the host is injected with path-though virtualization and vuala. Vuala in the present implementation context means and a guest OS application benefits from hardware acceleration similar to if the guest OS application would have ran directly on physical hardware. Further, there no significant CPU and memory overhead of at host OS level, and device drivers in a guest OS do not have to be replaced with virtual drivers that would translate to one or more device drivers in the host OS layers. Installation is simplified as a guest OS image does not need to be modified and is independent from underlying hardware infrastructure as drivers would not need to be swapped as in physical-to-personal (P2V) conversion.

Referring now to the figures, FIG. 1 is a block diagram of a computing system 10 implemented pristine machine 11 with a bifurcated OS. The primary components of the computing system 10 include a host operating system 12, a multi-function guest operating system 16, a secure guest operating system 14, a secured storage 18, a network Controller 13, a snapshot system 15, a pass-through for peripheral device drivers 17, and authenticity.

In an embodiment the host operating system 12 may be implement with a processor such as a x86 CPU or other known compatible processing architectures. The host operating system 12 may not be accessed by the user. The host OS 12 is the base of the virtualization system. In an embodiment there are two guest operation systems on the host: a multi-function guest OS 16 and a secure guest OS 14.

The host OS 12 uses a hypervisor system such as QEMU and KVM as a hypervisor system. It is appreciated that other hypervisor systems based on Xen, HyperV, or other technologies may be employed in embodiments of the invention. QEMU is a generic and open source machine emulator and virtualizer. KVM (Kernel-based Virtual Machine) is a virtualization infrastructure for the Linux kernel that turns the kernel into a hypervisor, which was merged into the Linux kernel. Both the multi-function guest OS 16 and the secure guest OS 14 are run simultaneously and may be activated (showed at display) by the user. In other words, context switching is a hide/show to give a user an appearance of a single guest OS with files serviced on secure guest OS 14 to provide security.

Embodiments of the multi-function guest operation system 16 act as a virtualized guest. The multi-function guest operation system 16 is part of the user's system that may be used like an operation system installed on the real hardware without a pristine machine. The multi-function guest operation system 16 has a network connection controlled by the host OS 12 and all peripheral devices 19 are available there. The multi-function guest OS 16 also has two modes of network usage: secured (all inbound/outbound communications are secure sockets layer (SSL), are tunneled) and non-secured (switching between modes is enabled by the user). Specific write-only access is available to secured storage 18, by mounted quarantine folder 21. All changes are stored on snapshots that are controlled by host Snapshot System 15 (for recovery capability).

Embodiments of the secured guest OS 14 are another virtualized guest. The secured guest OS 14 is typically booted from an unmodified image. The secured guest OS 14 has no peripherals 19 except for display and human interface devices (HID) (i.e., mouse and keyboard). The secured guest OS 14 also has no network access, except accessing secured storage 18—shared 23 and quarantine partitions 21. Secure guest OS 14 may be used in two roles, general mode (to access files stored on shared partition) and admin mode (to promote files from quarantine partition into shared partition when the files are determined to be safe). By default, the secured guest OS 14 is in the general mode. The admin mode may be activated by a special login with admin credentials. Both the general mode OS and admin mode OS have access to a shared partition 23 of secured storage 18, but only the admin mode OS has read access to the quarantine partition 21.

Embodiments of the secured storage 18 logically includes of two partitions—shared 23 and quarantine 21. The shared partition 23 and the quarantine partition 21 are mounted into the guest operating systems as folders. The secured storage 18 which may be in the cloud is an external network storage. The host operating system 12 has full access to these folders by simple file transfer protocol (SFTP). The host OS 12 starts its own secure shell (SSH) SFTP server which uses the network mounted shared 23 and quarantine partitions 21 as a source. This SSH SFTP server transfer restricts access to guest operation systems. For the multi-function guest OS 16 that does not have a SSH client, the host OS 12 also starts a server message block (SMB) server to transfer access to such systems.

Specific embodiments of the secured storage may have restriction rules:
  Secure guest in general and admin modes get full read-write access to shared partition.
  Secure guest in admin mode gets read-only access to quarantine partition.
  Multi-function guest does not get any access to shared partition.
  Multi-function Guest gets write-only access to quarantine partition.
  Host can check files to match malware signatures before they written into
  Quarantine partition via buffer in SFTP write operation callback.

Figure 2:
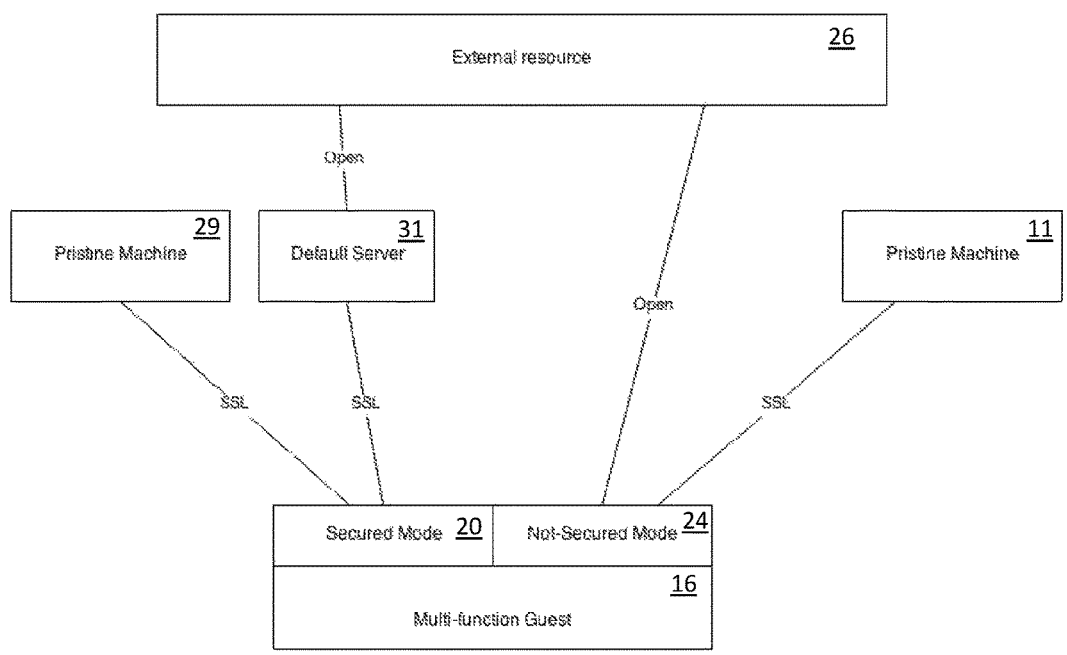
FIG. 2 is a block diagram illustrating network connections available from the multi-function guest OS with the network controller in accordance with embodiments of the invention.

FIG. 2 is a block diagram illustrating network connections available from the multi-function guest OS 16 with the network controller 13. In specific embodiments, the network transmission control protocol (TCP) connections may only be accessible from the multi-function guest OS 16. In a specific embodiment, there are two modes of network connectivity—secured mode 20 and non-secured mode 24. In secured mode 20, the multi-functional guest OS 16 may access network or internet connections only if these connections are deemed secure. In an embodiment the guest OS 16 will first attempt to connect via a secure tunnel. Should this connection fail, the guest OS 16 will attempt to connect via a default SSH server. Should this connection fail as well, no connection will be made. Direct secured tunnel is made using SSH port forwarding to a destination host. A tunnel to a default server uses SOCKS5 proxy that is run on the Host OS 12.

In non-secured mode 24, the multi-function guest OS 16 tries to build a direct port forwarding tunnel to a destination. If the multi-function guest OS 16 fails with the direct port forwarding tunnel, the multi-function guest OS 16 makes a direct connection to the destination such as an external resource 26. It is appreciated that the external resource 26 illustratively includes a network 28 or the Internet. An interception of a TCP connection from multi-function guest OS 16 is implemented on a Quick EMUlator (QEMU) slirp subsystem on the Host OS 12. QEMU is a free and open-source hosted hypervisor that performs hardware virtualization. Slirp (sometimes capitalized SLiRP) is a software program that emulates a PPP, SLIP, or CSLIP connection to the Internet via a shell account. Calls of "tcp_connect" functions are intercepted. The system then tries to build a direct tunnel using execution ssh-L port forwarding utility, and sends packets to a local SSH SOCKS5 proxy, that is started during a host boot process.

Continuing with FIG. 2, in a specific embodiment of a Pristine Machine™ (PM) 29 that provides network access for a multi-function guest 16. The pristine machine 29 operates with a bifurcated OS has two types of guest OS: secure guest OS and multi-function guest OS (MF) 16, where only a MF 16 has network access via a non-secured mode 24, and the secured OS 20 does not have any network access. The MF Guest 16 may operate with a network in secured mode 20 and non-secured modes 24. A Pristine Machine™ (PM) may use a next type of outbound connections chain (for all modes):
1. Pristine 29—Pristine 29 (with SSL key)
2. Pristine 29—Default Server 31 (with SSL key)— External resource 26 (Open)

where connections between two Pristine Machines™ 29 and between a Pristine Machine™ 29 and a default server 31 have to be encrypted. A default server 31 is a proxy for redirecting a pristine Machine™ request to external network. A PM 29 may allow inbound connections (unencrypted and encrypted) either from another PM or from any host in the Internet as usual (of course if local Firewall allows them for this PM). Pristine Machines™ 29 are required to have a certificate based authentication procedure to perform a handshake, and to be able to validate endpoints.

Figure 3:
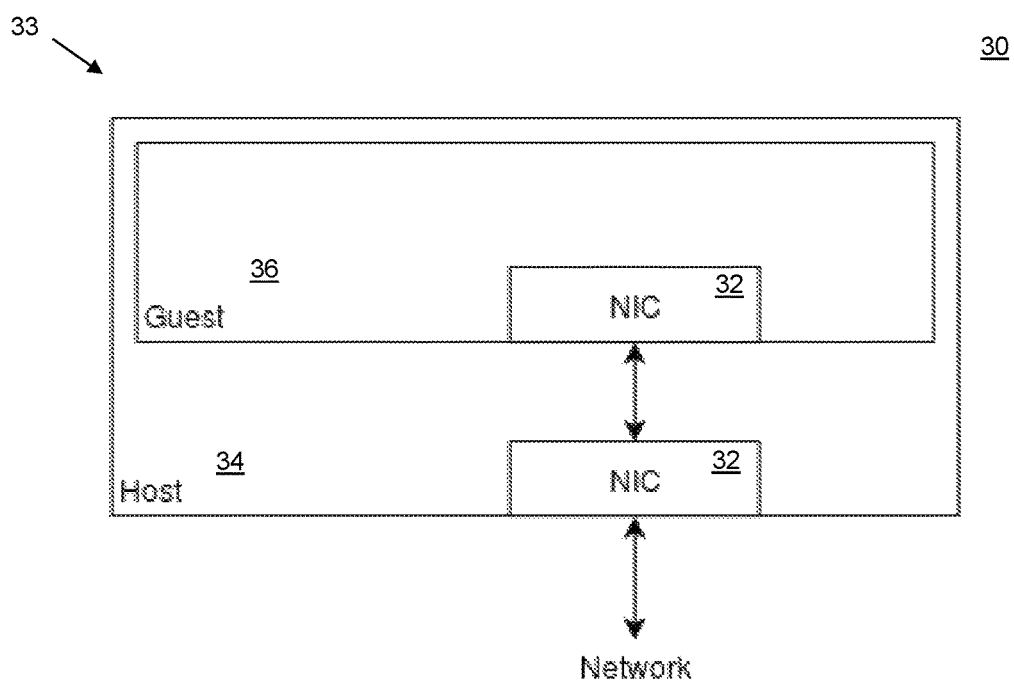
FIG. 3 illustrates a block diagram of a typical prior art pristine machine (PM) and associated network interfaces for the host and guest.

FIG. 3 illustrates a block diagram 30 of a typical prior art pristine machine (PM) 33 and associated network interface controllers (NIC) 32 for the host OS 34 and guest OS 36. Present implementations of PM 33 use QEMU-KVM as a hypervisor. QEMU (an abbreviation for Quick Emulator) is a free and open-source hosted hypervisor that performs hardware virtualization. QEMU is a hosted virtual machine monitor, which emulates CPUs through dynamic binary translation and provides a set of device models, enabling it to run a variety of unmodified guest operating systems. QEMU also can be used together with Kernel-based Virtual Machines (KVM). KVM is a virtualization solution that turns the Linux operating system kernel into a hypervisor in order to run virtual machines at near-native speed (requiring hardware virtualization extensions on x86 machines). QEMU can also be used purely for CPU emulation for user-level processes, allowing applications compiled for one architecture to be run on another. However, as noted above the present implementation of a network controller in a PM suffers from problems illustratively including low speed, high utilization of the central processor unit (CPU) usage— less then 10% of allowed bandwidth; support for only outbound connections, support for only IPv4 and TCP; and security limitations (man-the-middle attacks are possible).

A Pristine Machine™ (PM) used in the present invention has been detailed in the prior art of U.S. Pat. No. 8,843,926, to facilitate understanding the present invention, the details of PM are found in the following paragraphs [0077]-[0202] that are incorporated by reference.

Although the systems described here are described in the context of two separate operating systems, a host and a guest, each having its own framework and functionality, the techniques described here are not limited to such a bifurcated structure. In some implementations, both of the operating systems are wrapped within a single computer program having two sectors that cooperate with each other as if they were independent systems, with the sector that directly interfaces with user being periodically refreshed under the control of the second sector that interfaces solely with the hardware and communication layers of the computer system.

For example, some operating systems are designed so as to divide operations between kernel space and user space. Kernel space program code manages computing resources used by applications in user space. Example functions for kernel space program code include, but are not limited to, processor management, memory management, and device management. A kernel abstraction layer may be provided for isolation required to protect host operating system resources from being damaged by a guest operating system user space process, such as a virtual machine program. In turn, the guest operating system divides operations between kernel and user space and provides for isolation of user space processes executing within the guest operating system. A virtualization layer between the guest operating system and the host operating system may provide an additional layer of isolation in the event that the guest operating system is insecure and allows user space processes to directly or indirectly tamper with kernel space objects.

Inventive embodiments of Pristine Machines™ (PM) and associated network interfaces based on QEMU (a generic and open source machine emulator and virtualizer) are organized on one of Slirp (a software program that emulates a PPP, SLIP, or CSLIP connection to the Internet via a shell account), TAP (network tap—simulates a link layer device and operates with layer 2 packets such as Ethernet frames), and network interface controllers (NIC).

As used herein, a test access point (TAP) is defined as a virtual network kernel device which simulates a link layer device and operates with layer 2 packets. In contrast to conventional thinking that a kernel must be stable and is only capable of running simply computational functions, according to the present invention the kernel is a layer to which part of a bifurcated function is allocated.

Figure 4:
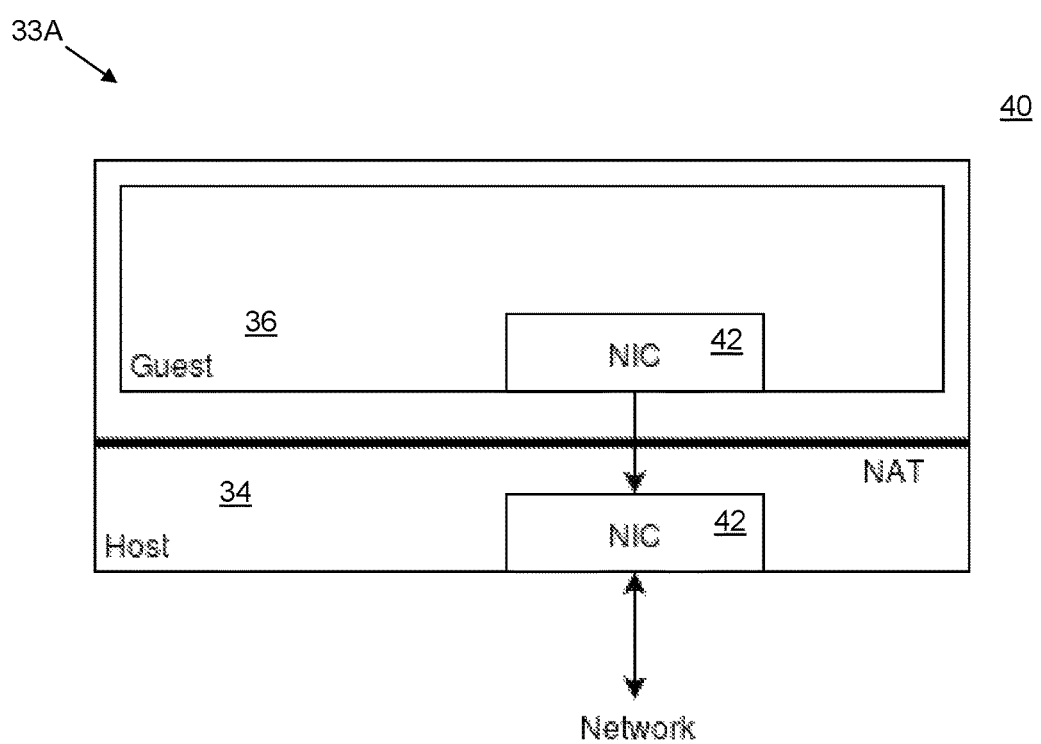
FIG. 4 illustrates a block diagram of a pristine machine (PM) and associated network interfaces for the host and guest based on a Slirp implementation in accordance with an embodiment of the invention.

FIG. 4 illustrates a block diagram 40 of a Pristine Machine™ (PM) 33A and associated network interfaces 42 for the host OS 34 and guest OS 36 based on a Slirp implementation in accordance with an embodiment of the invention. This type of organization creates a virtual Network Interface Controller (NIC) 42 inside a virtual machine (VM) and translates all requests to the external world by parsing low-level data. The host OS 34 also simulates a Network address translation (NAT), so the guest OS resides in its own subnet. Network address translation (NAT) is a methodology of remapping one IP address space into another by modifying network address information in Internet Protocol (IP) datagram packet headers while they are in transit across a traffic routing device. The NAT forbids any inbound connections except the inbound connections that were explicitly set by QEMU using QEMU's port forwarding functionality.

Figure 5:
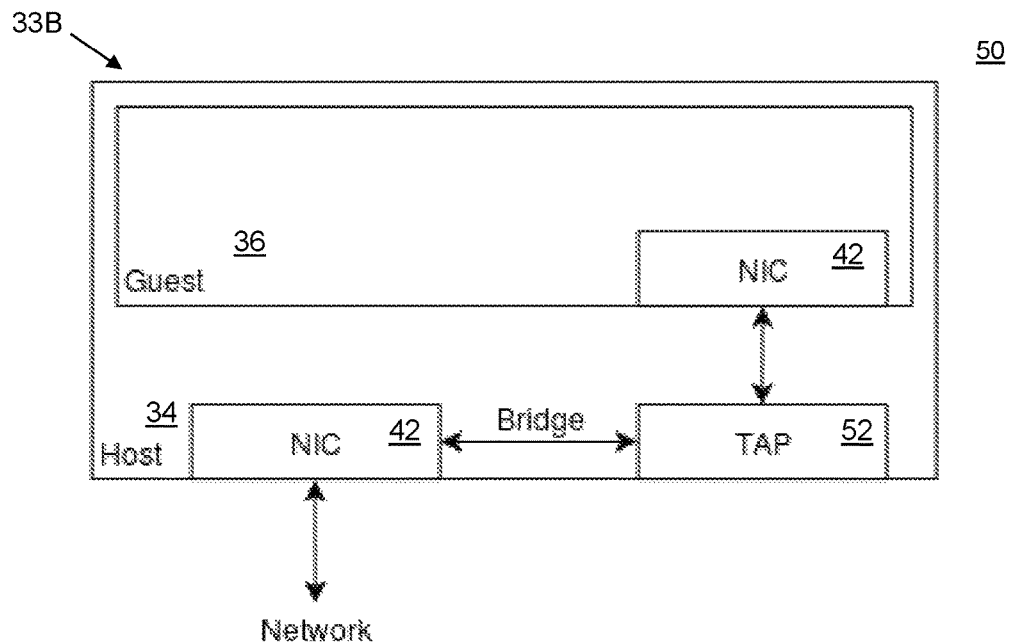
FIG. 5 illustrates a block diagram of a pristine machine (PM) and associated network interfaces for the host and guest based on a TAP implementation in accordance with an embodiment of the invention.

FIG. 5 illustrates a block diagram 50 of a Pristine Machine™ (PM) 33B and associated network interface controllers 42 for the host OS 34 and guest OS 36 based on a TAP 52 implementation in accordance with an embodiment of the invention. In PM 33B the virtual network interface TAP 52 implemented in the host OS 34 provides a bridge between the TAP interface 52 and interface that represents the physical network interface controller (NIC) device 42. The TAP interface 52 allows for transparently connecting to a virtual machine (VM) from the external world and vice versa because the VM has an IP address in the same subnet as the host OS. The TAP interface 52 is in turn the host OS 34 network interface, where direct connections may be isolated by a NetFilter.

Figure 6:
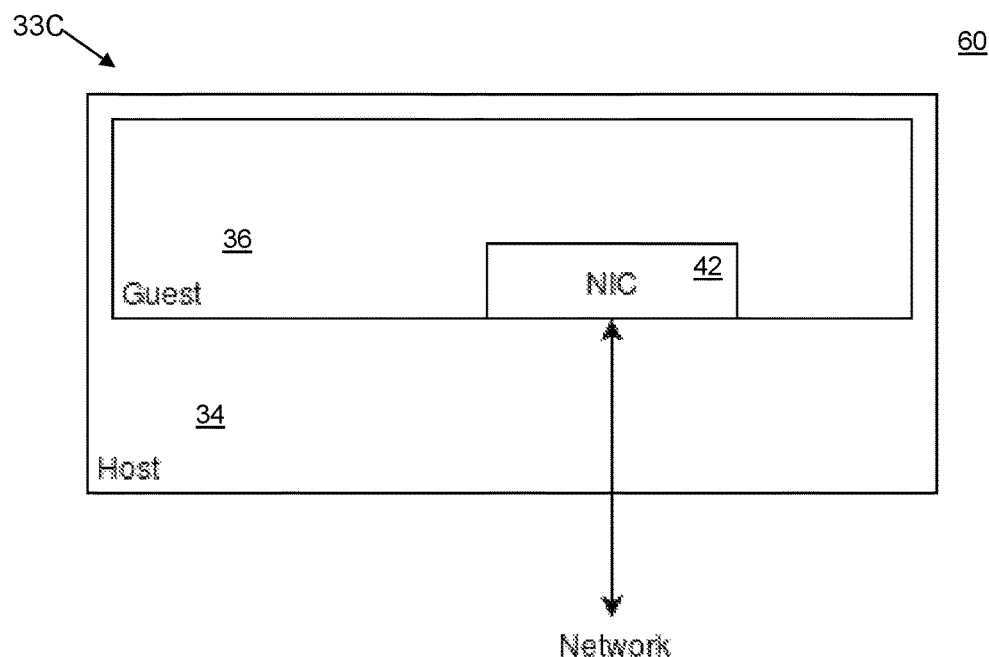
FIG. 6 illustrates a block diagram of a pristine machine (PM) and an associated network interface for the host and guest based on a network interface controller (NIC) pass-through in accordance with an embodiment of the invention.

FIG. 6 illustrates a block diagram 60 of a Pristine Machine™ (PM) 33C and an associated network interface 42 for the host OS 34 and guest OS 36 based on a NIC pass-through in accordance with an embodiment of the invention. In this embodiment, the VM has full control under the host OS NIC and manipulates with the NIC without any mediators. Unlike other types of host OS, it is appreciated that a host OS NIC implementation has no network access in this organization. So in this case control has to be implemented entirely inside guest. Such an arrangement can lead to less security, but conversely this approach results in a higher level of control over security management.

Table 1 provides benchmark performance test results for a real, pass-through, TAP, and Slirp implementations as described above based on function bifurcation. All comparisons were with speed of native NIC on the same OS installed on bare-metal machine ("real" mark).

TABLE 1

| | Benchmark Test | | | | | | | | |
|---|---|---|---|---|---|---|---|---|---|
| | Bandwidth Out TCP (MB/s) | % of real | Bandwidth Out UDP (MB/s) | % of real | Bandwidth In TCP (MB/s) | % of real | Bandwidth In UDP (MB/s) | % of real | Qemu CPU usage |
| Real | 112 | 100% | 112 | 100% | 112 | 100% | 112 | 100% | N/A |
| Pass-through | 111 | 99% | 110 | 98% | 111 | 99% | 110 | 98% | 17% |
| TAP | 24 | 21% | 18 | 16% | 83 | 74% | 58 | 51% | 35% |
| Slirp | 12 | 11% | 19 | 17% | 1.7 | 1.5% | 8.6 | 7.7% | 37% |

Figure 7:
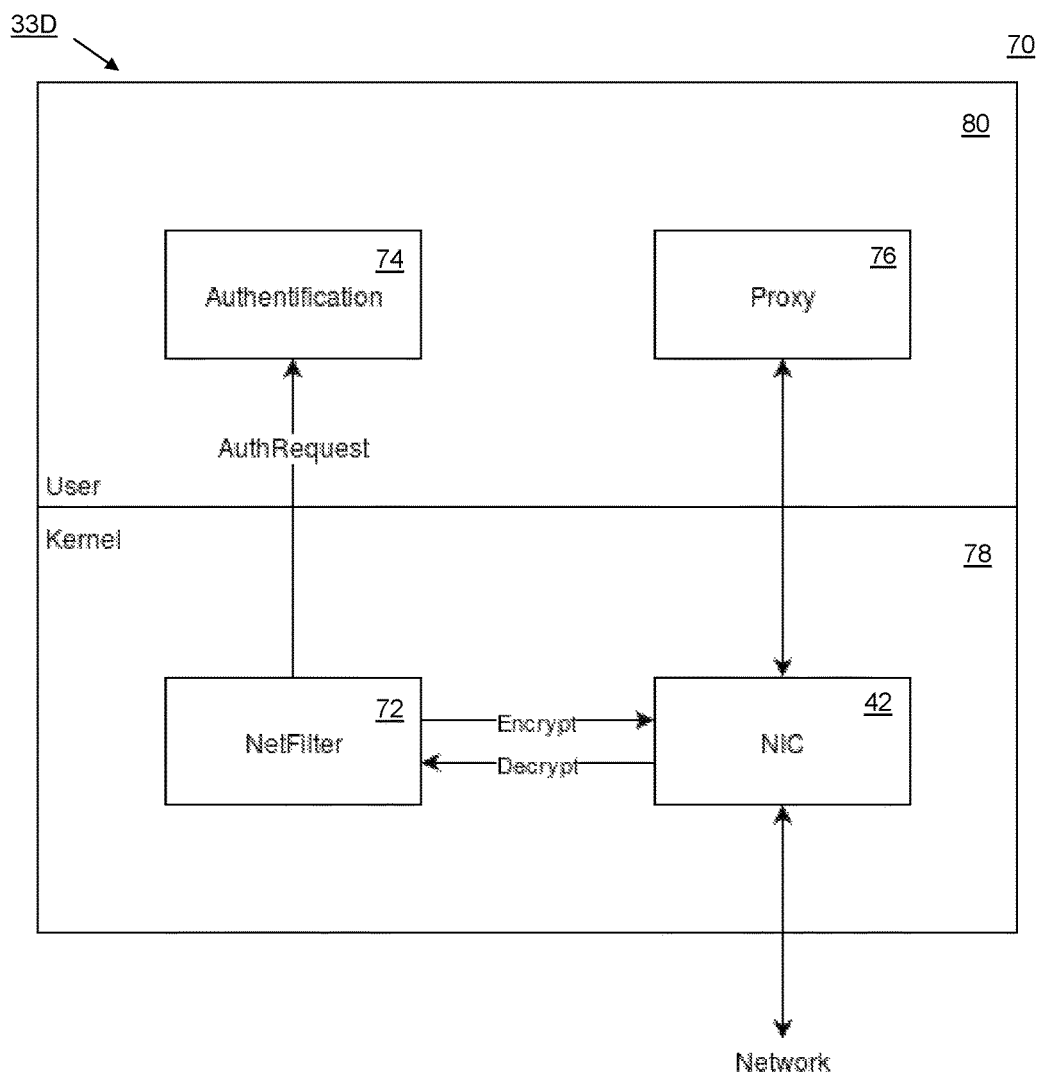
FIG. 7 illustrates a network controller implemented entirely inside the host operating system of a pristine machine in accordance with embodiments of the invention.

FIG. 7 illustrates a network controller 70 implemented entirely inside the host operating system of a Pristine Machine™ 33D in accordance with embodiments of the invention. The network controller 70 includes the following functions: filtering and encryption; authentication; and proxy. Network packet filtering allows for the detection of outbound and inbound packets in accordance with a set of defined rules and changing their payload on a specific network layer. The system has two different filtering levels: L2 filtering and L4 filtering (L2—Link or L4—Transport), and two corresponding encryption levels: L2 encryption and L4 encryption.

Figure 8:
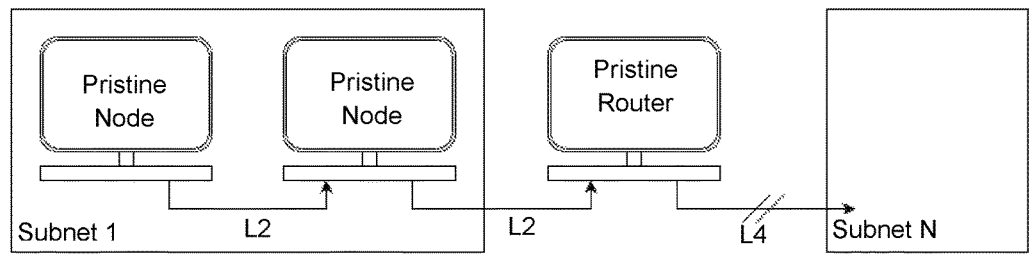
FIG. 8 illustrates communication between pristine nodes in a subnet and a pristine router outside the subnet in accordance with an embodiment of the invention.

As shown in FIG. 8 packets sent from one Pristine node to another Pristine node within the subnetwork have L2 encryption. Packets sent from one Pristine node to another Pristine node via the Pristine Router have L2 encryption prior to going through the router, and L4 encryption thereafter.

L2 Filtering

L2 filtering deals with outbound IP packets transferred from one node to another with the source and destination IP addresses fitting the subnet mask. Ethernet MAC address is used as a source and a destination on this filtering level.

The outbound packets must adhere to the following criteria for L2 filtering to be used:
1. The packet has a unicast destination; broadcast and multicast packets are ignored.
2. A router cannot be the next hop for the packet.
3. The packet destination is a Pristine node for which there are valid symmetric encryption keys.

If all criteria are satisfied, the packets are sent to the L2 encryption system for compression. If only the first and the second criteria are satisfied, i.e., the packet destination is not on the list of the known Pristine nodes, an asynchronous request is made for authentication and analyzing if the destination point is a Pristine node.

If only the first criterion is satisfied, the packet is sent to the L4 filtering system.

The inbound packets must adhere to the following criterion for L2 filtering to be used:
1. The packet source is a Pristine node for which there valid symmetric encryption keys.

If the criterion is satisfied, the packet is sent to the L2 encryption system for decompression.

L4 Filtering

L4 filtering deals with outbound IP packets transferred from one node to another with the source and destination IP addresses not fitting the subnet mask. An IP (IPv6) address is used as a destination on this filtering level. The source for inbound packets is defined according to the selected L4 encryption method: with or without modifying the payload.

The outbound packets must adhere to the following criteria for L4 filtering to be used:
1. The packet has a unicast destination; broadcast and multicast packets are ignored.
2. The transport protocol is TCP or UDP (IPv6/TCP, IPv6/UDP); other protocols are ignored.
3. A Pristine Router is the next hop of the packet.
4. The packet destination is a Pristine node for which there are valid symmetric encryption keys.

If all criteria are satisfied, the packet is sent to the L4 encryption system.

If only criteria 1-3 are satisfied, i.e., the packet destination is not on the list of the known Pristine nodes, an asynchronous request is made for authentication and analyzing if the destination point is a Pristine node.

If only the first and the second criteria are satisfied, i.e., the router is not a Pristine router, the packet is sent to the Default Server via a tunnel.

Other packets are accepted (ACCEPT) or dropped (DROP), depending on the security procedure requirements.

The inbound packets must adhere to the following criterion for L4 filtering to be used:
1. The packet source is a Pristine node for which there are valid symmetric encryption keys.

If the criterion is satisfied, the packet is sent to the L4 encryption system for decompression.

L2 Encrypting

The packet contents are encrypted with a symmetric encryption algorithm using block cipher that does not change the data size. The packet has the information remaining in network layer (L3) headers for passing through other filters, communicators, and delivery.

L4 Encrypting

Two encryption variants are possible: with and without modifying the payload.

Figure 9:
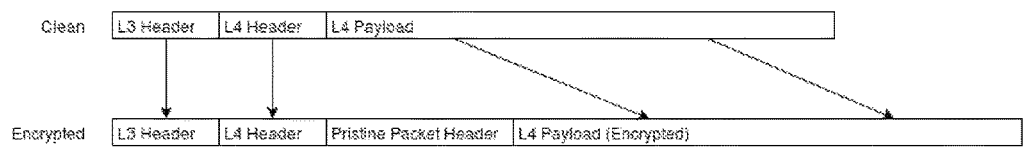
FIG. 9 illustrates a packet header that is clean and the corresponding encrypted header with a modified L4 encrypted payload.

Encryption with modifying the payload—The Transport layer (L4) packet contents are encrypted with a symmetric encryption algorithm using block cipher that does or does not change the data size. Before the encrypted payload, there is Pristine Packet Header, a particular header containing the information about the encrypted content. It may contain a magic marker, indication of the packet being encrypted, and of sender identification, auxiliary data to detect the method and/or work of the encryption algorithm. The network and transport-layer headers have the checksum and payload length updated. The sender identification for the inbound packets is performed with the help of the Pristine Packet Header data. FIG. 9 illustrates a packet header that is clean and the corresponding encrypted header with a modified L4 encrypted payload.

Encryption without modifying the payload—The Transport layer (L4) packet contents are encrypted with a symmetric encryption algorithm using block cipher that does not change the data size. The transport layer payload does not contain any additional headers. The network and transport layer headers have only the checksums updated. The sender identification for the inbound packets is performed with the help of the network and transport layer headers data. It is noted that using embodiments of the aforementioned method with IPv4 protocols does not allow performing sender authentication with the help of the Source IP in the IP headers only. This will result in the systems working incorrectly with the packets going through the routers with firewalls using NAT systems that make changes to those headers.

Figure 10:
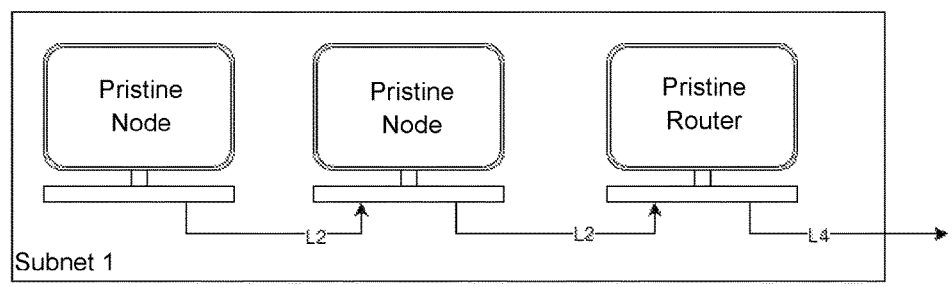
FIG. 10 illustrates communication between pristine nodes an a pristine router within a subnet in accordance with an embodiment of the invention.

In specific inventive embodiments a Pristine node itself is able to perform only L2 encryption of the outbound packets for a direct communication with another Pristine node within one subnetwork. In case the packet is sent to another subnetwork, the Pristine node checks if the Pristine Router is set as the Default Gateway in the routing table. If it is, the packet is sent to it with L2 filtering and encryption, similar to being sent to a usual Pristine node. This is shown in FIG. 10. In FORWARD packet clauses, the Pristine Router uses outbound L4 filtering and L4 encryption systems. On the destination Pristine node, inbound L4 filtering and L4 encryption systems are used.

Default Server Encryption Proxy (DSEP)—Proxy subsystem implements Pristine—Default Server—External communication—occurs if a Pristine Machine is not in a secure network and/or the Pristine Router is not the next hop. In this case, the Pristine Machine (PM) opens a UDP tunnel to the Default Server and through it, sends all the traffic that is supposed to be sent to another subnetwork. The Default Server performs the network address translation (NAT) for the tunneled packets and sends them to an external host. The Default Server must follow the Authenticity Server authentication procedure.

Host-Guest Interaction—The Pristine Machine Guest OS does not require additional software being installed into the Guest OS. All filtering, encryption, and secure traffic routing processes are running on the Host OS. The Guest OS uses the network in a transparent way, without knowing the traffic will get encrypted or tunneled. To ensure the interaction on the Host side, the TAP virtual machine device, TUN device, and physical Ethernet device join into a network bridge in different network namespaces. For such namespaces, separate routing tables are created.

Figure 11:
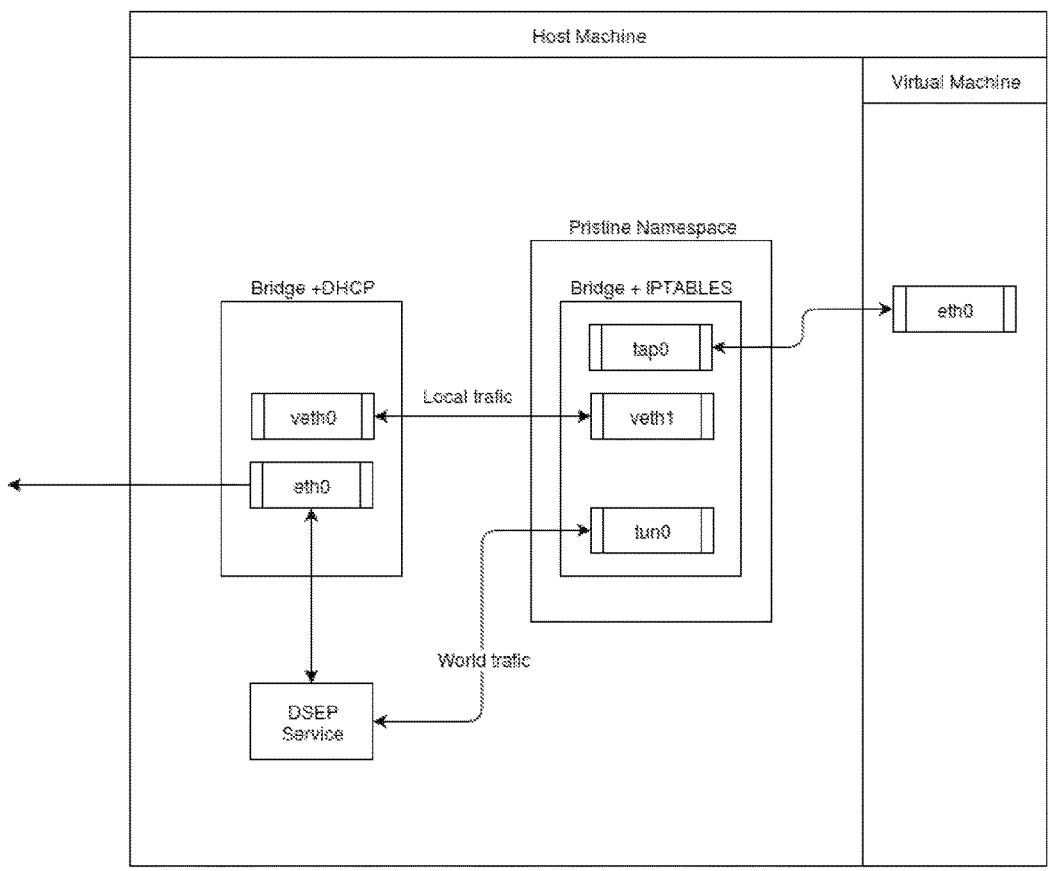
FIG. 11 illustrates a functional block diagram of an embodiment of a kernel module.

FIG. 11 illustrates a functional block diagram of an embodiment of a kernel module that performs network packets filtering on the L2 (Link) level. This module uses Linux kernel NetFilter (Xtables/iptables) framework to intercept raw packets and encrypt its data. The encryption uses AES256 or an analogous algorithm and a key that was received from user space via the Authentication subsystem. The kernel module keeps a table of key-value pairs with the destination IP as "key" and the symmetric key as "value". If a new packet was intercepted and the key has yet to be received, the packet is left empty. The received keys are valid for a defined period of time.

Authentication is the user space daemon that implements SSL client and server functionality. As a server, this system listens to the SSL socket on a specific port with its certificate that was received (generated) during installation phase (the first connection to the Authenticity server) and signed by the Validation Server (a server that can perform certificate validation, can be a part of Authenticity server).

Pristine-Authenticity Server Authentication

The Procedure of the Pristine Machine (PM) connection to the Authenticity Server (AS) will follow the following steps:

Note: Server has its Root Certificate and a private key for it to sign and validate.
1. The AS generates a temporary Token and a certificate Hash. The Hash and the Token are given to the PM user.
2. The PM during installation creates a secured connection (SSL connection) to the AS using the AS certificate. During the SSL handshake, the PM validates the certificate using the Hash entered by the user. As a result, the PM trusts the AS.
3. Using this secured connection, the PM sends the Token entered by the user to the server. The AS checks if the Token is present in the AS database and is valid. As a result, the AS trusts the PM.
4. The PM generates a Certificate Request (CR). This procedure also generates a Private Key (PK). The PM sends the CR to the server to create a Certificate and sign it using its Root Certificate.
5. The AS sends the Certificate back to the PM.
6. The AS and the PM perform another authentication procedure to communicate with the Secured Storage.

As a result of this procedure, the PM has its own Certificate signed by the Server Root Certificate and the PK for it to be able to process secure connections between trusted endpoints.

Pristine-Pristine authentication

The procedure for connection of client Pristine Machine #1 (PM client) to a server Pristine Machine #2 (PM server) will follow the following steps:
1. The PM client creates an SSL connection to a defined port of the PM server.
2. During the SSL handshake, the PM server sends its Certificate to the PM client.
3. The PM client validates the received Certificate using the connection to the AS (or a separate Validation Server). As a result, the PM client trusts the PM server.
4. Optional. During the SSL handshake, the PM client sends its Certificate to the PM server to validate the received Certificate using the connection to the AS (or a separate Validation Server). As a result, the PM server trusts the PM client.
5. The handshake is completed. The Server Side generates a symmetric key and sends it to another side. Also, the client sends its identification information to allow the client to be recognised by the server filtration system.

Referring again to FIG. 7 the implementation of the network controller 70 is more flexible to use with different types of host-to-guest connections than a conventional system and also affords additional advantages when applying changes. The network controller 70 includes filtering 72, authentication 74, and proxy 76.

Filtering 72 is performed in the kernel module 78 with filtering of network packets on the L2 (Link) level. The filtering module 72 uses Linux kernel NetFilter (Xtables/iptables) framework to intercept raw packets and encrypt data from the packet. Encryption uses AES256-CTR or analogue algorithm and a key that is obtained from a user space by the authentication subsystem 74. Client identification uses IP for L4 encryption level and MAC for L2 level. The filtering module 72 maintains a table of key-value pairs with a destination identification as a "key" and security information included as a symmetric key as an associated "value". Gray-listed requests can be left unencrypted or dropped in case filtering module 72 requires stricter security rules. If a new packet is intercepted and the key is presently not available, the intercepted packet is left clean. TTL (time to live) of a Key can be valid forever or has an expiration period. In case a key expires, the system should send a new authentication request to the Authenticity Server. In terms of encrypted data level—L2 and L4—all L2 payload has to be encrypted in the packet for L2 encryption level and L4 payload has to be encrypted in the packet for L4 encryption level.

Authentication 74 is a user space daemon that implements SSL client and server functionality. As a server this system listen SSL socket on a specific port with its certificate that was obtained (generated) on installation phase (first connection to the Authenticity server) and signed by a validation server (server that can perform certificate validation, and may be part of Authenticity server.

An inventive process for connection of a Pristine Machine™ (PM) to authenticity server (AS) may include the following steps that are premised on an authenticity server has a unique root certificate and private key for the server to sign and validate.
 1. AS generates temporary token and certificate hash. The hash and the token are given to the PM user.
 2. PM during installation creates secured connection (SSL connection) to AS using AS's certificate. During SSL handshake PM validates certificate using user entered hash. Result—PM trusts the AS.
 3. Using this secured connection PM sends to server a token entered by user. AS checks if the token is present in AS's database and if the token is valid. Result—AS trusts the PM.
 4. PM generates certificate request (CR). This procedure also generates Private Key (PK). PM sends CR to server to create certificate and signs certificate using its root certificate.
 5. AS sends signed certificate back to PM.
 6. AS and PM perform an additional authentication procedure to communicate with secured storage.

The result of this inventive process is that the PM has its own certificate signed by the server's root certificate and PK for it to be able to process secure connections between trusted endpoints An inventive process for Pristine Machine™ to Pristine Machine™ authentication for connection of a first Pristine Machine™ (PM client) to a second Pristine Machine™ (PM server) may include the following steps:
 1. PM client creates SSL connection to a defined port of PM server.
 2. During SSL handshake, PM server sends its certificate to PM client.
 3. PM client obtains validation certificate using connection to AS (or a separate validation server). Result—PM client trusts PM server.
 4. Optional. During SSL handshake PM client sends its certificate to PM server to validate certificate using connection to AS (or separate validation server). Result—PM server trusts PM client.
 5. Handshake is completed. SSL's master-key and a session-ID are then sent to the filter subsystem to calculating symmetric key.

The proxy subsystem implements Pristine—Default Server—External communication. An implementation embodiment is as follows:
 1. User level socket secure (SOCKS) proxy implementation in guest OS user level. SOCKS is an Internet protocol that routes network packets between a client and server through a proxy server. SOCKS5 additionally provides authentication so only authorized users may access a server.
    Pros:
        Simplicity of Default Server.
        Ready SOCKS client.
    Cons:
        Impossible to continue "gray-listed" Pristine Machine™-Pristine Machine™ request over Default server.
        Different guest implementation (Windows, Linux, etc.).
        Problems with intercepting connections from all applications.
        Easy to avoid interception on guest.
        Only TCP.
 2. IP tunnel implementation in host's kernel space.
    Pros:
        Works with all L4 protocols.
        Uses the same authentication and encryption functionality as Pristine Machine™ to Pristine Machine™ communication.
        Single implementation for all guest platforms.
    Cons:
        Kernel module inside default server.
        Implementation routing system on default server for packets that go back to the Pristine Machine™

Figure 12:
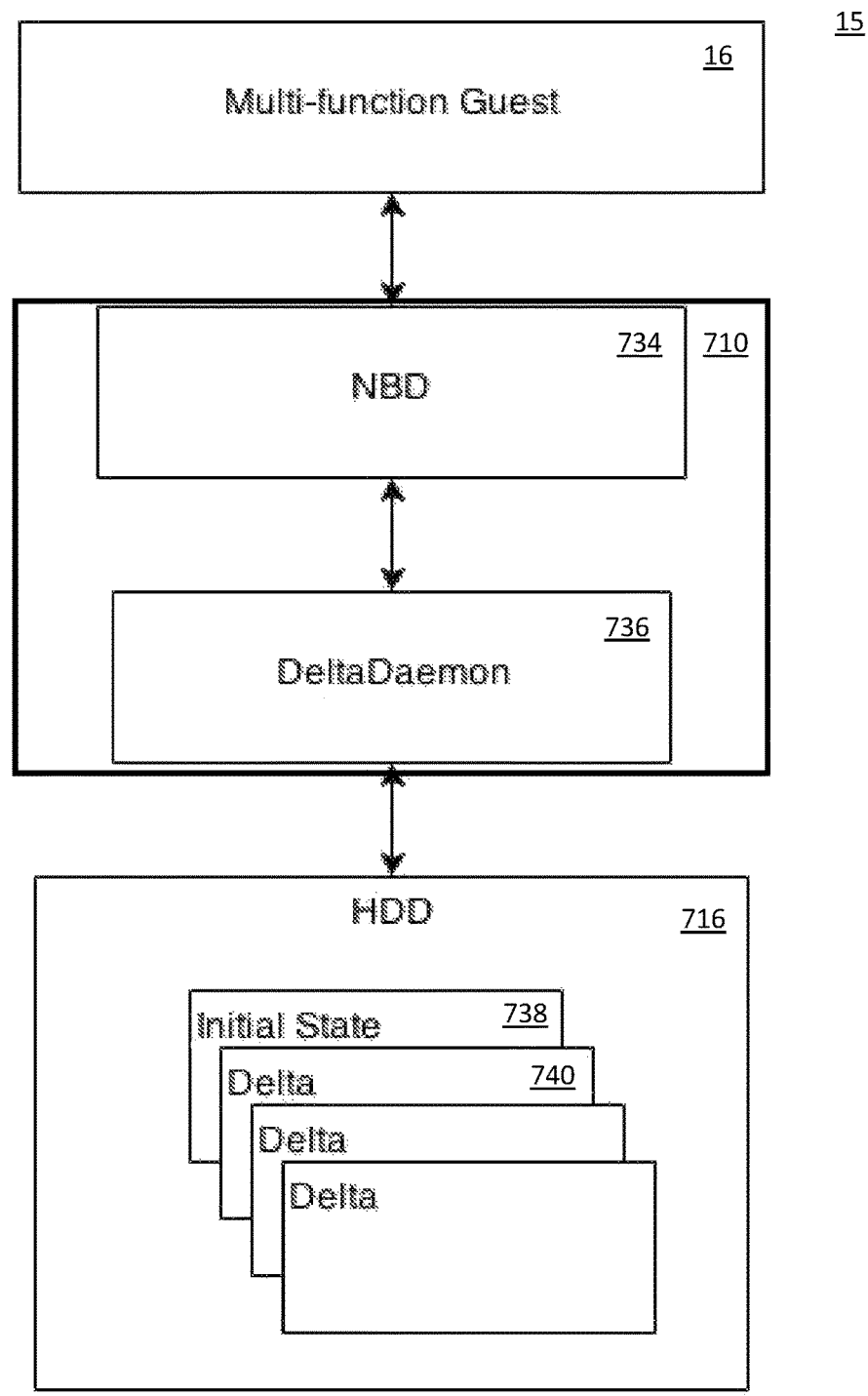
FIG. 12 is a functional block diagram of the snapshot system in accordance with embodiments of the invention.

FIG. 12 in conjunction with FIG. 1 is a functional block diagram of the snapshot system 15 that was first described in FIG. 1. The purpose of Snapshot System 15 is to guarantee a roll back capability when any change has corrupted the OS state. The multi-function guest OS 16 first boots from an initial state 738 and then stores all its files into snapshots called deltas 740. The snapshot system 15 is controlled by host OS 12 using special service DeltaDaemon 736. All disk I/O operations from the multi-function guest OS 16 go to DeltaDaemon 736 via network block device (NBD) 734 virtual device. DeltaDaemon 736 process this operation using Delta files 740. The snapshot system 15 uses binary snapshotting, all deltas between two stages are made using binary operations. DeltaDaemon 736 includes next parts: I/O processor, delta maker, and merger. The I/O Processor is used for complete NBD read and write operations from the guest OS. When the system first starts only an initial image is present. Delta maker creates a new delta file 740 and writes to that file all changed data that is requested using data from previous deltas 740 and the initial image. All read requests are processed results using all previous Deltas and the initial image. Data writes only to the latest Delta. The sequence of Deltas and the initial image is a stable state. Delta Maker is subsystem that by a timer creates a new Delta. Merger is subsystem that merges the two next deltas together in a new common delta file 740 when the delta files 740 no longer need to be kept individually due to their age.

The pass-through for peripheral device drivers 17 subsystem as shown in FIG. 1 solves the following problem where only the host operating system 12 has a direct access to peripheral devices 19, while the guest OS 14 needs to perform user functions to create multiple individual virtual devices that are translated into host devices and is inefficient in terms of performance and development effort. Embodiments of the invention provide a solution by creating a thin intermediate level that points guest device drivers directly into host peripheral memory and interrupt request signals (IRQs).

In specific embodiments, the multi-function guest OS 16 has access to all peripheral devices 19 that are on board as that are used in the system installed on the hardware. To use such peripheral devices 19, the pristine machine 11 has a pass-through feature that allows a transparent communication between device drivers inside a guest kernel and hardware. Three resources take part in communication between device and driver—interrupts, port IO, memory mapped IO, and dynamic memory allocation (DMA). The forwarding of interrupts, port IO, and memory mapped 10 are implemented in the QEMU and kernel-based virtual machine (KVM). The DMA forwarding is done using a thin generic redirection driver in the host and guest kernels. The driver in the guest kernels intercept DMA memory allocation requests, and sends allocation requests to the driver on the host OS 12. The driver on the host OS 12 creates real DMA allocation, and then this new memory area is remapped as a new memory slot in the guest virtual machine OS 16. This allows the use of the same DMA memory in the device and in the guest driver of a specific device. It is appreciated that in other embodiments alternative technologies such as memory management unit (MMU), etc., may be employed.

In inventive embodiments, and for example the authenticity of the model system 10 is based on keeping private keys for secured communications. The system 10 uses asymmetric encryption algorithms for data exchange. Each Pristine Machine 11 uses its own private key. Typically the private keys are temporal and the keys regenerate periodically. Public keys are spread or distributed between pristine machines using secure storage.

Figure 13:
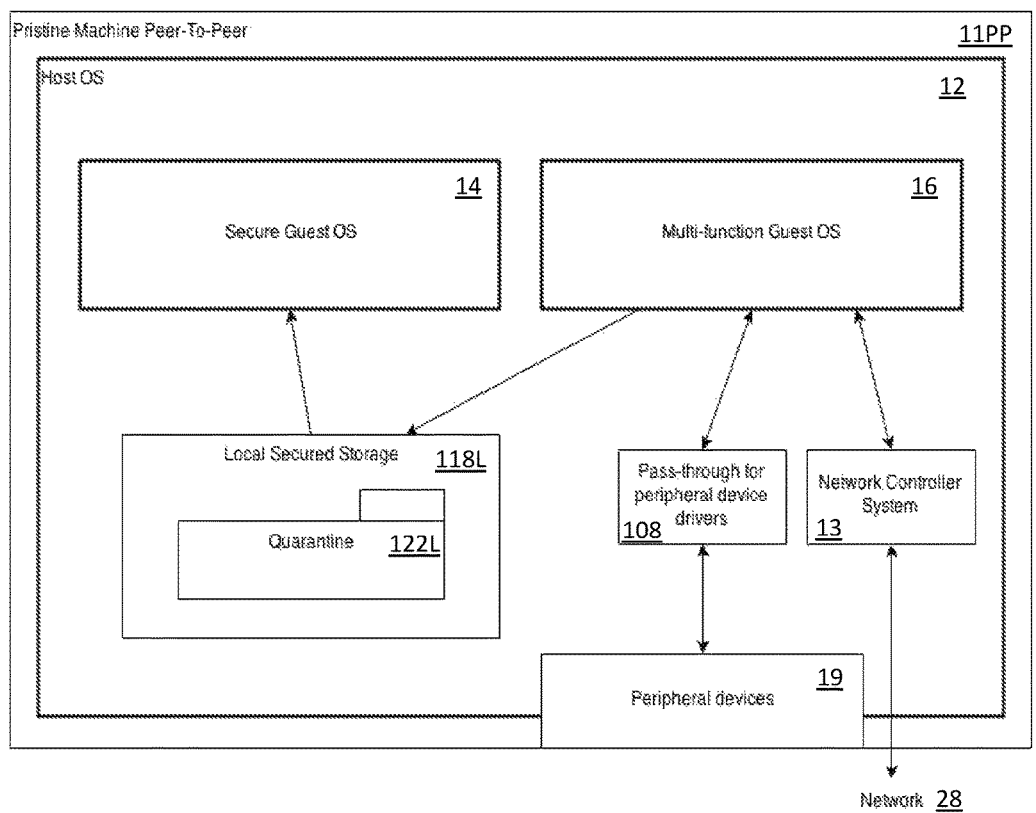
FIG. 13 is a functional block diagram for secure communications on a peer to peer basis for pristine machines in accordance with an embodiment of the invention.

FIG. 13 is a functional block diagram for secure communications on a peer to peer basis for pristine machines 11PP in accordance with an embodiment of the invention. The embodiment of the pristine machine peer-to-peer system 11PP is used to secure communication between mobile devices to eliminate risks of data interception and sensitive data leaks. The pristine machine peer-to-peer system 11PP may be installed on the user's communication device such as a smart phone, tablet, or any other portable computing and communication device. The primary components of the pristine machine peer-to-peer system 11PP include: a host operating system 12, a multi-function guest operating system 16, a secure guest operating system 14, local secure storage 118L, a network controller 13, a snapshot system 15, name resolution server and a dialer application. In a specific embodiment, an ARM central processing unit may be used with the same functionality for the host OS 12 as for the x86 CPU or other known compatible processing architectures. For the specific embodiment running on an ARM CPU, the guest operating system 16 runs on a hypervisor, where the guest has write only access to the quarantine partition 122L of the local secure storage 118L.

Figure 14:
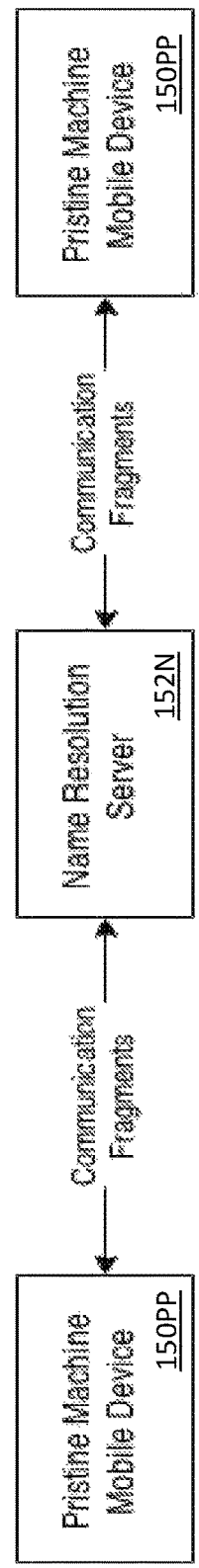
FIG. 14 is a block diagram of a name resolution server in accordance with embodiments of the invention.

Continuing with the peer to peer embodiment shown in FIG. 19, the secure guest operation system 14 boots from the previous available snapshot of the multi-function guest OS 16. In the specific embodiment, the secure guest operation system 14 does not have access to peripheral devices 19 and network 28. The secure guest operation system 14 is a closed operation system and has read only access to the quarantine partition 122L of the local secure storage 118L. A primary purpose of using this system is to use private data from the quarantine partition 122L of the local secured storage 118L to avoid data leakage. In the embodiment shown, the multi-function guest operation system OS 16 has access to local secured storage 118L that is controlled by the host OS 12. The local storage 118L supports only this node and cannot be connected to any other device. The local secure storage 118L contains only one quarantine partition 122L. The network controller 13 and snapshot system 15 operate as described for the embodiment of FIGS. 1 and 3 above. The name resolution server 152N as shown in FIG. 14 is used for routing data packets between peer-to-peer endpoints 150PP, the operation of which were shown in FIG. 13. The name resolution server 152N does not have information about data in data packages that it routs. The name resolution server 152N is a network server application for the transport layer of TCP/IP stack. The name resolution server 152N only routes traffic and does not have the ability to intercept packets for third-party loggers. Communication between nodes and a server consist of discrete and encrypted packets that are assembled and processed by nodes only. The use of the name resolution server 152N is a better approach then tunneling so as not having to maintain the stream session. In embodiments the names may be a phone number, e-mail, or other type of alias. In embodiments of the invention the dialer application is a program that makes phone calls over a network to the same program. An audio stream is split into small encrypted fragments (like texting/transferring attachments), and these fragments are sent to an addressee through the name resolution server 152N.

Figure 15:
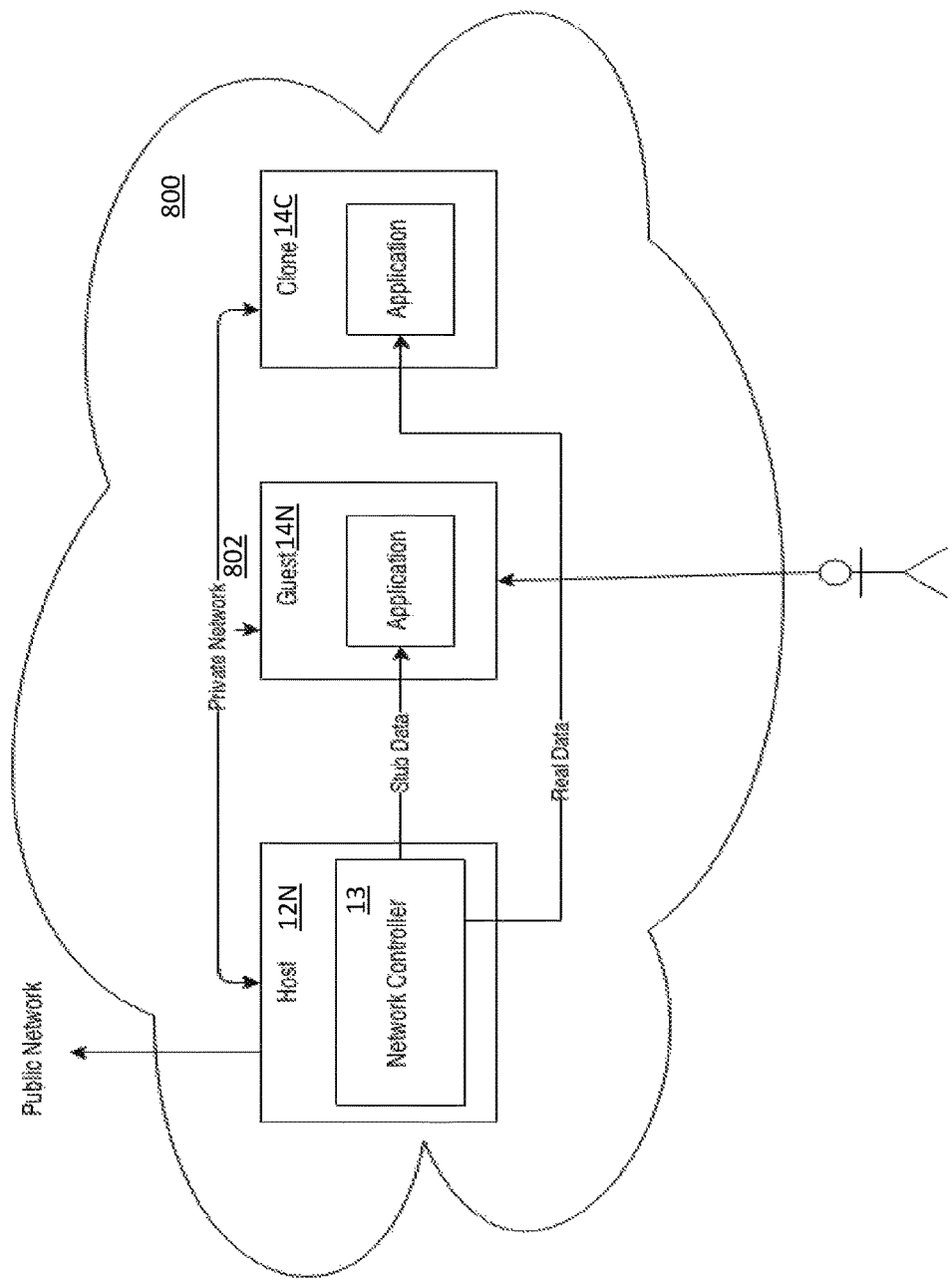
FIG. 15 is a schematic representation of a cloud based implementation of an embodiment of a pristine machine with a bifurcated operating system.

FIG. 15 is a schematic representation of a cloud based implementation 800 of an embodiment of a pristine machine with a bifurcated operating system. Embodiments of the pristine cloud 800 control security of private data inside the cloud that guarantee that data during computing inside accessible nodes cannot be accumulated and leaked. The pristine cloud 800 also guarantees control of resources with no risk to memory scraping.

The pristine cloud solution 800 guarantees that cloud resources are only consumable by secure pristine nodes that do not contain the risk of sharing information in an unauthorized way. Specific embodiments of the pristine cloud 800 work only with state-independent compute nodes. The primary components of an embodiment of the pristine cloud solution 800 include a host node 12N, secure guest node 14N, clone of secure guest node 14C, secured cloud resource, network controller 13, and cloud private network component 802. Embodiments of the cloud system 800 contain three computing nodes that run simultaneously on an OpenStack: a host node 12N, secure guest node 14N, and clone of secure guest 14C. The host OS 12N takes control of guest access 14N to secure storage. The host OS 12N also controls guest 14N and clone of guest 14C networks using private network 802. Host node 12N is inaccessible for a user of the pristine cloud 800.

In an embodiment an algorithm for use of the pristine cloud 800 is as follows: a user makes a data request to the guest node 14N over network controlled by the host 12N, the host 12N authenticates the data request and sends the data request to the clone of guest 14C, as well as sending a stub data request to the guest 14N. Subsequently, the guest 14N and the clone 14C process their data and send results to an addressee through the host 12N. The host 12N replaces the guest result with the clone result. The host 12N reviews outbound traffic according to its volume (optionally per endpoint), contents, and adherence to other policies.

In embodiments of the pristine cloud 800, the secured guest OS 14N is the main computing node. The secured guest OS 14N has full access to secure storage given by the host 12N. The secured guest OS 14N contains user data and services. The secured guest OS 14N has access to the network over the host private network 802. The clone of the secured guest 14C is a node that is started from the same image as the secured guest 14N, and is not accessible for the user and is connected to the network using the host private network 802.

In embodiments of the pristine cloud 800 examples of a secured cloud resource may be object storage or block storage. The secured cloud resource has a special track that restricts its consumption through to Pristine nodes. The secured cloud resource is invoked through standard cloud (OpenStack) application program interface (API). The host operating system 12N has full access to this resource using an OpenStack API. The host 12N transparently redirects access to this partition to the secure guest node 14N. The network controller 13 used in embodiments of the pristine cloud 200 may be the software on the host 12N that routes data requests to guest 14N and clone of guest nodes 14C, performs authentication, and routes outbound data from the guest 14N and clone of guest 14C. In embodiments of the pristine cloud 800, the cloud private network 802 is used to share data between various components used in the pristine cloud 800.

Figure 16:
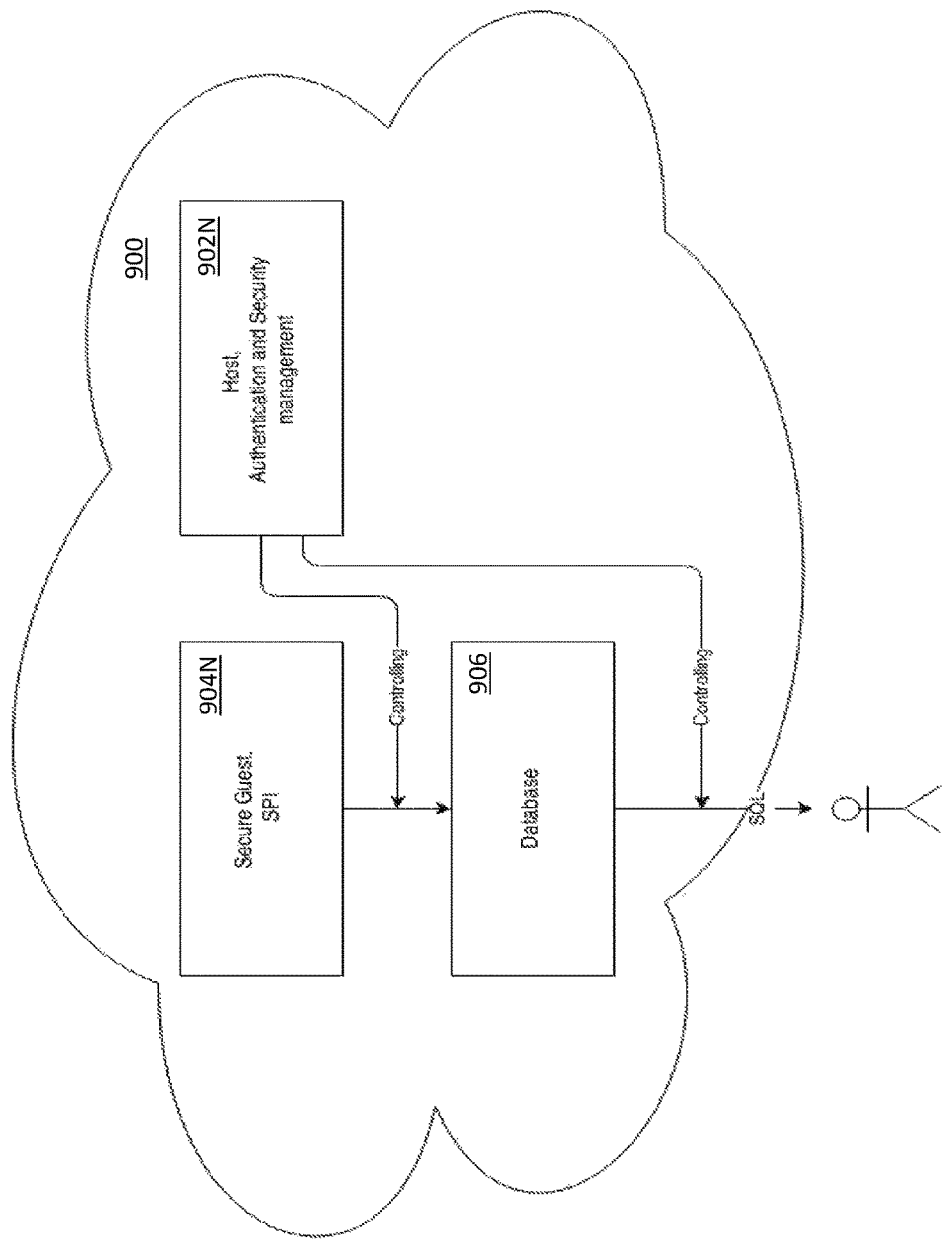
FIG. 16 illustrates a block diagram of an embodiment of a pristine database that is an extension of the cloud based implementation of FIG. 6 of a pristine machine with a bifurcated operating system in accordance with embodiments of the invention.

FIG. 16 illustrates a block diagram of an embodiment of a pristine database 900 that is an extension of the cloud based implementation 800 of FIG. 15 of a pristine machine with a bifurcated operating system. The primary components of the pristine database 900 are a host node 902N, a secure guest node 904N, a database node 906, a resource, and a migration utility.

The host node OS 902N has the same functionality as described above in FIG. 21 and is responsible for authentication access to the resource and security management. The host node OS 902N also controls outbound data transfer from the database node 906 by quotas. In an embodiment, the secured guest OS 904N is the stateless computing node that provides service provider interface (SPI) adapter between the database software and resource, assembly, and disassembly data. The secured guest OS 904N is the main computing node, and has full access to secure storage provided by the host 902N. The secured guest OS 904N contains user data and services, and has access to a network over a host private network. The secured guest OS 904N also contains migration tools. The database node 906 is a computer stateful node. The database node 906 includes database software (i.e., PostgreSQL) that provides a structured query language (SQL) API 1002 that is described further in FIG. 17.

Figure 17:
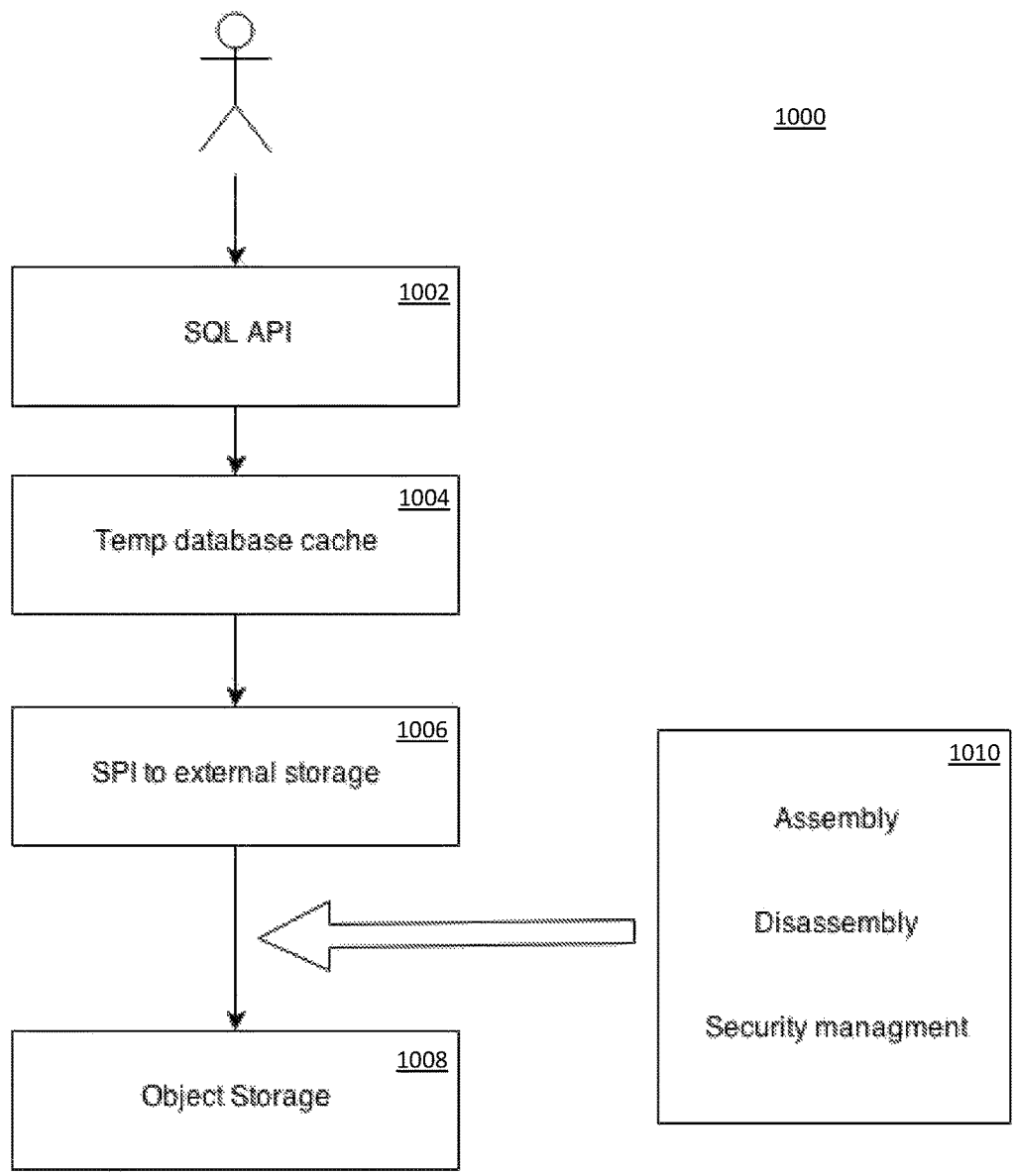
FIG. 17 is a block diagram showing a logical data flow in accordance with embodiments of the invention.

FIG. 17 is a block diagram showing the logical flow. The logical data flow 1000 includes an SQL API 1002 that transfers data to a temporary database cache 1004 and uses a service provider interface (SPI) adapter to transfer data to external storage 1006 and with assembly/disassembly/security management 1010 to object storage 1008. In specific inventive embodiments, a resource is a resource serviced by the OpenStack service (such as an object storage BLOB). This resource is secured by an embodiment of the pristine cloud implementation (FIG. 21). A resource instance is transformed into a fragment of an SQL table by a state-independent assembly service (block 1010). Changes are preserved using the state-independent disassembly service (block 1010). Both services could reside in the same guest container or be split up for performance tuning purposes. Security management (block 1010) provides policy enforcement regarding constraints for sharing resource data with the outside world that are performed by the host 902N. The migration utility is a set of scripts that may provide batch migrating data to and from embodiments of the pristine database 900. Native (for source database and Postgre DB) bulk transfer is to be used whenever possible for performance reasons, and to retain the logic of higher level database object such as views, triggers and stored procedures. In a database the computing environment the function of storage and retrieval of data is bifurcated and data storage is in the object storage of the database.

Alternatives and Extensions

In specific inventive embodiments, bifurcation of system function in addition to a bifurcated OS may be employed, where execution of system function is split between multiple layers even when two layers are not one simple bifurcated OS. For example overcoming of CAP is not primarily done by a bifurcated OS but by extending the core concept to a bifurcation of system function.

Bifurcation of functions is made into two separate layers. Algorithms are split with only part being run in each space and the outcomes combined. In this way greater speed results and the user sees no differences. The split may be determined by human selection of how to parse the function between the two environments or be done by machine, afterwards once the split has been made the function split can be optimized based on machine performance feedback (speed is normalized based on initial split, then part of algorithm is moved between layers and if speed goes up, the split is maintained, else revert and try something else). A non-limiting example of a simple split function can be the loading of the function in both layers and simply turning off aspects in the first layer with mirror image (on-off) aspects in the second layer. If there are two conflicting vectors in the same function, those are automatically split to get maximal throughput.

In a specific inventive embodiment network I/O encryption, which is usually performed in a user system and not in system space or kernel space, is performed in the kernel space. A split encryption protocol is provided where once the user space is authenticated and protocols are established then all of the packets chosen can be authenticated within the kernel space. In a specific embodiment, a real packet and a hash packet are the same size, and if identification (ID) scheme is the same, then real packets can be hashed with existing protocols. As a result, there is no significant speed decline caused by the encryption.

The encryption split is optimized in the same way as above where either a guess split is made or the machine performs the split to do the encryption and then tweaks are made based on machine performance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:

1. A method for accelerating data transfer in a computing environment comprising:
   splitting a function into two layers of an operating system the computing environment to generate two separate sets of outcomes from the two layers;
   combining said set of outcomes from the two layers; and
   evaluating and optimizing the splitting of said function based on machine performance feedback based on a common identification (ID) scheme and a real packet and a hash packet of the same size and hashing said real packet in one of said two layers separate from simultaneous operation on said real packet in another of said two layers.

2. The method of claim 1 wherein one of said two layers is a kernel.

3. The method of claim 2 wherein another of said two layers is a user space.

4. The method of claim 1 wherein said function is an encryption protocol.

5. The method of claim 1 wherein said performing sharing of data is based on keeping a set of private keys for secure communication.

6. The method of claim 1 wherein said computing environment is a bifurcated operating system (OS) having a host OS and a virtual guest OS.

7. The method of claim 1 wherein said performing sharing of data is based on keeping a set of private keys for secure communication.

8. The method of claim 1 wherein said computing environment is a network.

9. The method of claim 1 wherein the splitting of said function is through offsetting algorithm code disablement between said two layers from a complete algorithm loaded into both of said two layers.

10. The method of claim 1 wherein said computing environment is a database and said function is storage and retrieval of data and further comprising storing said data is in an object storage.

11. A computing system for accelerating data transfer comprising:
 a machine having a bifurcated host operating system;
 a secured storage having a shared partition and a quarantine partition;
 a multi-function guest operating system storing data to the quarantine partition;
 a secure guest operating system downloading the data from the quarantine partition and in read-write communication with the shared partition;
 a network controller in communication with said multi-function guest operating system; and accelerating data transfer by:
 a function algorithm split between two layers of said bifurcated host operating system to generate two separate sets of outcomes from the two layers upon code operation on data, then combining said set of outcomes from the two layers, and
 evaluating and optimizing the splitting of said function algorithm based on machine performance feedback.

12. The system of claim 11 further comprising a slirp subsystem that performs hardware virtualization on said bifurcated host operating system.

13. The system of claim 11 wherein said secured storage is cloud storage.

14. The system of claim 11 wherein said secured storage is local to said host operating system.

15. The system of claim 11 wherein said host operating system runs on a hypervisor system.

16. The system of claim 11 further comprising a snapshot system in communication with said multi-function guest operating system.

17. The system of claim 11 further comprising a pass-through for peripheral device drivers and authenticity in communication with said multi-function guest operating system.

18. The system of claim 11 further comprising a server message block server to transfer access to at least one of said secure guest operation system or said multi-function guest operating system.

19. The system of claim 11 further comprising a secure shell server for said bifurcated host operating system which uses the shared partition and the quarantine partition as sources and restricts access to said secure guest operation system.

20. The system of claim 19 wherein said secure shell server further restricts access to said multi-function guest operating system.

21. The system of claim 11 system further comprising a secure mode and a non-secured mode to said multi-functional guest operation, said secured mode having access to the network only if a connection to the network is secure.

22. The system of claim 21 wherein said secure mode connects to the network via a secure tunnel via a secure shell server.

23. The system of claim 22 wherein said non-secured mode connects to the network via a direct port forwarding tunnel to a destination.

* * * * *